(12) United States Patent
Chen

(10) Patent No.: US 11,433,768 B2
(45) Date of Patent: Sep. 6, 2022

(54) VEHICLE INFORMATION DISPLAY APPARATUS, SYSTEM AND METHOD

(71) Applicant: BOE TECHNOLOGY GROUP CO., LTD., Beijing (CN)

(72) Inventor: Shuo Chen, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 911 days.

(21) Appl. No.: 16/316,998

(22) PCT Filed: Jun. 15, 2018

(86) PCT No.: PCT/CN2018/091468
§ 371 (c)(1),
(2) Date: Jan. 10, 2019

(87) PCT Pub. No.: WO2019/041972
PCT Pub. Date: Mar. 7, 2019

(65) Prior Publication Data
US 2021/0331585 A1    Oct. 28, 2021

(30) Foreign Application Priority Data
Aug. 31, 2017 (CN) .......................... 201710771549.4

(51) Int. Cl.
*H04W 4/80* (2018.01)
*B60K 35/00* (2006.01)
(Continued)

(52) U.S. Cl.
CPC ........... *B60K 35/00* (2013.01); *H04M 1/6091* (2013.01); *H04W 4/021* (2013.01); *H04W 4/48* (2018.02);
(Continued)

(58) Field of Classification Search
CPC ............ B60K 35/00; B60K 2370/5911; B60K 2370/1868; B60K 2370/563; H04W 4/48; H04W 4/80; H04W 4/021; H04M 1/6091
(Continued)

(56) References Cited

U.S. PATENT DOCUMENTS 8,816,837 B2 * 8/2014 Braden ............ G08G 1/096775
340/936
9,902,343 B2 * 2/2018 Hague ..................... B60R 25/01
(Continued)

FOREIGN PATENT DOCUMENTS

CN     203397636 U     1/2014
CN     103594034 A     2/2014
(Continued)

OTHER PUBLICATIONS

CN First Office Action in Application No. 201710771549.4, dated Aug. 28, 2020.
(Continued)

*Primary Examiner* — April G Gonzales
(74) *Attorney, Agent, or Firm* — Syncoda LLC; Feng Ma

(57) ABSTRACT

A vehicle-mounted display apparatus includes a display panel, a geographic position acquisition circuit, a processor, and a display panel driving circuit. The geographic position acquisition circuit acquires a current geographic position of a vehicle. The processor determines whether the current geographic position of the vehicle is within a stored geographic range, and if so, generates a first control signal. The display panel driving circuit controls the display panel to display the vehicle information upon receiving the first control signal from the processor. The vehicle information includes at least one of vehicle license information and a pseudo mobile phone number. In the display apparatus, an information push terminal communicating circuit commu-
(Continued)

nicates with an information push terminal to obtain the vehicle information and the stored geographic range, and a server communicating circuit communicates with a server to obtain the pseudo mobile phone number corresponding to an identification for the display apparatus.

21 Claims, 21 Drawing Sheets

(51) Int. Cl.
    *H04W 4/48* (2018.01)
    *H04M 1/60* (2006.01)
    *H04W 4/021* (2018.01)
(52) U.S. Cl.
    CPC ....... *H04W 4/80* (2018.02); *B60K 2370/1868* (2019.05); *B60K 2370/563* (2019.05); *B60K 2370/5911* (2019.05)
(58) Field of Classification Search
    USPC .......................................................... 701/36
    See application file for complete search history.

(56) References Cited

U.S. PATENT DOCUMENTS

| | | | | |
|---|---|---|---|---|
| 10,181,104 B2* | 1/2019 | Haque | ................... | G06Q 40/08 |
| 10,304,027 B1* | 5/2019 | Haque | ................... | G06Q 50/30 |
| 10,489,816 B1* | 11/2019 | Duke | ....................... | G07F 17/26 |
| 2002/0126023 A1* | 9/2002 | Awada | ............. | G08G 1/096783 |
| | | | | 340/988 |
| 2011/0193694 A1* | 8/2011 | Bowden | ................. | B60K 35/00 |
| | | | | 340/438 |
| 2013/0006775 A1* | 1/2013 | Jordan | ..................... | G08G 1/20 |
| | | | | 705/14.62 |
| 2013/0300554 A1* | 11/2013 | Braden | ............ | G08G 1/096775 |
| | | | | 340/441 |
| 2013/0303143 A1* | 11/2013 | Schrader | ................. | H04W 8/18 |
| | | | | 455/418 |
| 2014/0225724 A1* | 8/2014 | Rankin | ................. | G06F 3/0482 |
| | | | | 340/438 |
| 2015/0227335 A1* | 8/2015 | Hori | ....................... | G06F 3/1423 |
| | | | | 715/761 |
| 2016/0330691 A1* | 11/2016 | Park | ....................... | G01C 19/42 |
| 2017/0085867 A1* | 3/2017 | Baran | ................. | H04N 13/302 |
| 2017/0255264 A1* | 9/2017 | Dash | ....................... | G06F 3/016 |
| 2018/0024695 A1* | 1/2018 | Iyer | ........................ | B60K 35/00 |
| | | | | 345/175 |
| 2018/0143754 A1* | 5/2018 | Niazi | ........................ | B60R 1/00 |
| 2019/0035267 A1* | 1/2019 | Balzer | ..................... | G08G 1/07 |
| 2019/0064953 A1* | 2/2019 | McCoy | ................. | G06F 3/0386 |

FOREIGN PATENT DOCUMENTS

| | | |
|---|---|---|
| CN | 204472683 U | 7/2015 |
| CN | 105072186 A | 11/2015 |
| CN | 205059456 U | 3/2016 |
| CN | 107018240 A | 8/2017 |
| CN | 107103774 A | 8/2017 |
| JP | 2002092785 A | 3/2002 |
| JP | 2007283991 A | 11/2007 |
| JP | 2012128475 A | 7/2012 |

OTHER PUBLICATIONS

Extended European Search Report in Application No. 18803850, dated Mar. 10, 2021.
International Search Report and Written Opinion dated Sep. 6, 2018 in PCT/CN2018/091468.
CN 2nd Office Action in Application No. 201710771549.4, dated Aug. 4, 2021.

* cited by examiner

VEHICLE INFORMATION DISPLAY APPARATUS, SYSTEM AND METHOD

CROSS-REFERENCE TO RELATED APPLICATION

The present application claims priority to Chinese Patent Application No. CN 201710771549.4 filed on Aug. 31, 2017, the disclosure of which is hereby incorporated by reference in its entirety.

TECHNICAL FIELD

The disclosure relates generally to display technologies, and more specifically to a vehicle information display apparatus, a vehicle information display system, and a vehicle information display method.

BACKGROUND

A vehicle registration card, or a vehicle license card, is commonly placed in front of a driver's seat in a vehicle. The vehicle registration card usually contains, by prints, information regarding the vehicle and/or an owner of the vehicle, based on which the identity of the driver/owner can be verified by a specialized personnel, such as a gate attendant of a parking lot or of a company campus, etc. to thereby allow the vehicle to pass through a gate into an area that he or she is in charge of.

SUMMARY

In a first aspect, the present disclosure provides a display apparatus mounted on a vehicle for display a vehicle information (i.e. vehicle information display apparatus, vehicle-mounted display apparatus, or display apparatus hereafter).

The vehicle information display apparatus includes a display panel, a geographic position acquisition circuit, a processor, and a display panel driving circuit.

The geographic position acquisition circuit is configured to acquire a current geographic position of the vehicle. The processor is configured to determine whether the current geographic position of the vehicle is within a stored geographic range, and to generate a first control signal if so (i.e. if the current geographic position of the vehicle is within the stored geographic range). The display panel driving circuit is configured to control the display panel to display the vehicle information upon receiving the first control signal from the processor.

Optionally, the vehicle information display apparatus can further include an information push terminal communicating circuit, which is configured to communicate with an information push terminal to obtain the vehicle information and the stored geographic range therefrom.

Optionally, the vehicle information display apparatus can further include a vehicle speed detector, which is configured to detect a current speed of the vehicle. As such, the processor is further configured to compare the current speed of the vehicle with a threshold speed, and to generate a second control signal if the current speed of the vehicle is lower than the threshold speed, and the display panel driving circuit is further configured to control the display panel to display the vehicle information upon receiving the second control signal from the processor.

Optionally, the vehicle information display apparatus can further include a locked instruction detector, which is configured to detect a locked instruction from the vehicle. As such, the processor is further configured to generate a third control signal if the locked instruction is detected from the vehicle; and the display panel driving circuit is further configured to control the display panel to display the vehicle information upon receiving the third control signal from the processor.

In any one of the embodiments of the vehicle information display apparatus described above, the vehicle information can comprise at least one of vehicle license information and a pseudo mobile phone number.

According to some embodiments of the disclosure, the vehicle information comprises a pseudo mobile phone number, and the information push terminal communicating circuit is configured to send a request for a real mobile phone number to the information push terminal and then to receive the real mobile phone number from the information push terminal.

Additionally, the vehicle information display apparatus can further include a sever communicating circuit configured to send the real mobile phone number and a pseudo mobile phone number acquisition request to a sever, and then to obtain the pseudo mobile phone number generated by the sever based on the real mobile phone number.

According to some embodiments of the vehicle information display apparatus, the display panel comprises an E-ink display panel.

In a second aspect, the present disclosure further provides a vehicle information display system, which comprises a vehicle information display apparatus based on any one of the embodiments as described above.

Optionally, the vehicle information display system can further include an information push terminal, which is configured to communicate at least one of vehicle information and geographic range to the vehicle information display apparatus.

Optionally, the vehicle information display system can further include a server, which is configured, upon receiving a pseudo mobile phone number request carrying an identification for the vehicle information display apparatus, to generate, and then to send to the vehicle information display apparatus, a pseudo mobile phone number corresponding to the identification for the vehicle information display apparatus.

In a third aspect, an information push terminal is further provided.

The information push terminal includes an information input portion and a first transmitting and receiving circuit. The information input portion is configured to allow at least one of vehicle information and geographic range to be inputted into the information push terminal, and the first transmitting and receiving circuit is configured to transmit the at least one of the vehicle information and the geographic range to a vehicle information display apparatus.

According to some embodiments of the information push terminal, the first transmitting and receiving circuit is further configured to receive a request for a real mobile phone number from the vehicle information display apparatus, and then to send the real mobile phone number to the vehicle information display apparatus.

Optionally, in the information push terminal, the first transmitting and receiving circuit is configured to communicates with the display apparatus via at least one of Bluetooth, infrared communication, WIFI, or Zigbee.

In a fourth aspect, a server is further provided.

The server includes a second transmitting and receiving circuit and a generating portion. The second transmitting and receiving circuit is configured to receive, and to send to the generating portion, a pseudo mobile phone number request from a vehicle information display apparatus, wherein the pseudo mobile phone number request carries an identification for the display apparatus. The generating portion is configured to generate, and to send to the second transmitting and receiving circuit, a pseudo mobile phone number corresponding to the identification for the vehicle information display apparatus. Then the second transmitting and receiving circuit is further configured to send the pseudo mobile phone number to the vehicle information display apparatus.

According to some embodiments of the server, the generating portion is further configured to correspondingly bundle the pseudo mobile phone number with a real mobile phone number by means of the identification for the display apparatus.

Herein, the second transmitting and receiving circuit can optionally be configured to beforehand receive the real mobile phone number from the display apparatus.

Alternatively, the second transmitting and receiving circuit does not beforehand receive the real mobile phone number from the vehicle information display apparatus, and the pseudo mobile phone number request can carry the real mobile phone number corresponding thereto.

According to some embodiments, the server further comprises a third transmitting and receiving circuit and an acquisition portion. The third transmitting and receiving circuit is configured to receive a real mobile phone number request carrying the pseudo mobile phone number from a wireless communication network upon a calling request is sent from the primary calling terminal to the wireless communication network. The acquisition portion is configured, upon receiving the real mobile phone number request from the third transmitting and receiving circuit, to obtain the real mobile phone number corresponding to the pseudo mobile phone number from the generating portion. The third transmitting and receiving circuit is further configured, upon receiving the real mobile phone number from the acquisition portion, to send the real mobile phone number to the wireless communication network.

According to some embodiments, the server is a remote server, and the second transmitting and receiving circuit is configured to communicate with the display apparatus via a wireless communication network.

Herein the server can be in a cloud, and thus can be a cloud server.

In a fifth aspect, the present disclosure further provides a method for displaying vehicle information utilizing a display apparatus mounted on a vehicle. The display apparatus mounted on a vehicle can be the vehicle information display apparatus according to any one of the embodiments as described above.

The method comprises the following steps:
obtaining a current geographic position of the vehicle; and
determining whether the current geographic position of the vehicle is within a stored geographic range; and if so,
displaying the vehicle information.

According to some embodiments of the method, prior to the displaying the vehicle information, the method further comprises a step of:
obtaining at least one of the vehicle information and the geographic range from an information push terminal.

Herein, the vehicle information can comprise at least one of vehicle license information and a pseudo mobile phone number.

According to some embodiments of the method where the vehicle information comprises a pseudo mobile phone number, prior to the displaying the vehicle information, the method further comprises:
sending a pseudo mobile phone number request carrying an identification for the display apparatus to a server;
generating the pseudo mobile phone number corresponding to the identification for the display apparatus in the server; and
receiving the pseudo mobile phone number from the server.

Optionally, after the generating the pseudo mobile phone number corresponding to the identification for the display apparatus in the server, the method further includes:
correspondingly bundling the pseudo mobile phone number with a real mobile phone number in the server.

Herein, optionally the real mobile phone number can be beforehand stored in the server.

Alternatively, the real mobile phone number is not beforehand stored in the server, and the real mobile phone number is carried in the pseudo mobile phone number request.

According to some embodiments, after the correspondingly bundling the pseudo mobile phone number with a real mobile phone number in the server, the method further includes the following steps:
a wireless communication network sending a real mobile phone number request carrying the pseudo mobile phone number to the server upon receiving a calling request from the primary calling terminal;
the server obtaining the real mobile phone number corresponding to pseudo mobile phone number; and
the server sending the real mobile phone number to the wireless communication network to thereby establish a calling between the primary calling terminal and a mobile phone having the real mobile phone number.

According to some embodiments of the method, the sending a pseudo mobile phone number request carrying an identification for the display apparatus to a server is performed if the current geographic position of the vehicle is within the stored geographic range.

According to some embodiments of the method, the displaying the vehicle information comprises:
obtaining a current speed of the vehicle;
determining if the current speed of the vehicle is lower than a threshold speed; and if so
displaying the vehicle information.

According to some other embodiments of the method, the displaying the vehicle information comprises:
determining whether a locked instruction is received from the vehicle; and if so
displaying the vehicle information.

Throughout the disclosure, a circuit (e.g. the geographic position acquisition circuit, the display control circuit, etc., as mentioned above and throughout the disclosure) is referred to as a part, possibly including a hardware member and optionally a corresponding software instructing the hardware member, configured to perform a purported functionality. A portion (e.g. the information input portion, the generating portion, the acquisition portion, etc., as mentioned above and throughout the disclosure) is referred to as a functional module possibly including software applications stored as instructions in a memory and executable by a processor, and optionally accompanying hardware members as well, which is configured also to perform a purported functionality.

BRIEF DESCRIPTION OF DRAWINGS

In order to clearly illustrate the various embodiments provided in the present disclosure, the following are drawings that accompany the description of the embodiments.

It is noted that these drawings shall be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments shall be interpreted to be contained within the scope of the disclosure.

DETAILED DESCRIPTION

Figure 1A:
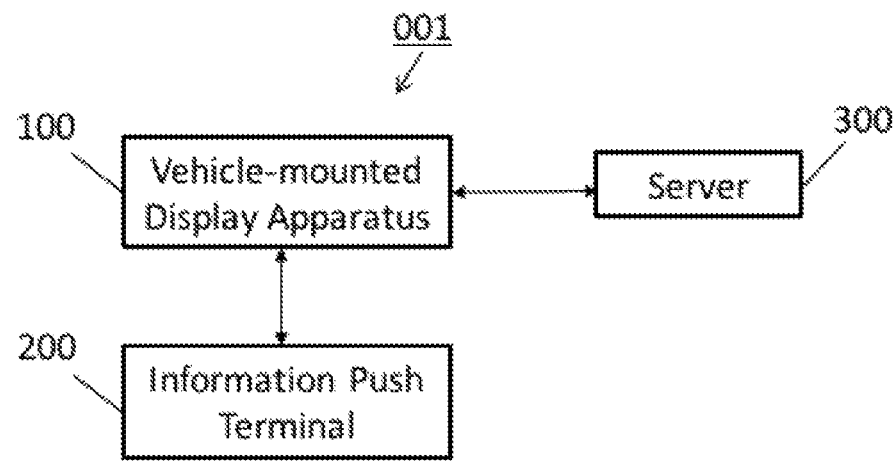
FIG. 1A illustrates a vehicle information display system according to some embodiments of the disclosure.

Various embodiments of the present disclosure are described below with specific examples, and other advantages and effects of the present disclosure can be easily understood by those skilled in the field of technology from the contents disclosed in this specification.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

In conventional vehicle information display approaches that typically involve a vehicle registration card, the information printed on the vehicle registration card usually contains private information about the driver/owner of the vehicle, such as the owner's name, mobile phone number, and so on. As such, the privacy of the driver/owner of the vehicle can be easily leaked.

On the other hand, the vehicle registration card is usually made of a white paper. Because the vehicle registration card is typically placed in front of a driver's seat of the vehicle, the reflection of lights by the vehicle registration card also can impose a safety concern when the driver/owner is driving the vehicle.

In order to address the above issues for the vehicle information display, the present disclosure provides a vehicle information display apparatus, a vehicle-information display system, an information push terminal, a server, and a vehicle information display method.

In a first aspect, the present disclosure provides a display apparatus mounted on a vehicle for display a vehicle information (i.e. vehicle information display apparatus, vehicle-mounted display apparatus, or display apparatus hereafter).

The vehicle information display apparatus includes a display panel, a geographic position acquisition circuit, a processor, and a display panel driving circuit.

The geographic position acquisition circuit is configured to acquire a current geographic position of the vehicle. The processor is configured to determine whether the current geographic position of the vehicle is within a stored geographic range, and to generate a first control signal if so (i.e. if the current geographic position of the vehicle is within the stored geographic range). The display panel driving circuit is configured to control the display panel to display the vehicle information upon receiving the first control signal from the processor.

Optionally, the vehicle information display apparatus can further include an information push terminal communicating circuit, which is configured to communicate with an information push terminal to obtain the vehicle information and the stored geographic range therefrom.

Optionally, the vehicle information display apparatus can further include a vehicle speed detector, which is configured to detect a current speed of the vehicle. As such, the processor is further configured to compare the current speed of the vehicle with a threshold speed, and to generate a second control signal if the current speed of the vehicle is lower than the threshold speed, and the display panel driving circuit is further configured to control the display panel to display the vehicle information upon receiving the second control signal from the processor.

Optionally, the vehicle information display apparatus can further include a locked instruction detector, which is configured to detect a locked instruction from the vehicle. As such, the processor is further configured to generate a third control signal if the locked instruction is detected from the vehicle; and the display panel driving circuit is further configured to control the display panel to display the vehicle information upon receiving the third control signal from the processor.

In any one of the embodiments of the vehicle information display apparatus described above, the vehicle information can comprise at least one of vehicle license information and a pseudo mobile phone number.

According to some embodiments of the disclosure, the vehicle information comprises a pseudo mobile phone number, and the information push terminal communicating circuit is configured to send a request for a real mobile phone number to the information push terminal and then to receive the real mobile phone number from the information push terminal.

Additionally, the vehicle information display apparatus can further include a sever communicating circuit configured to send the real mobile phone number and a pseudo mobile phone number acquisition request to a sever, and then to obtain the pseudo mobile phone number generated by the sever based on the real mobile phone number.

According to some embodiments of the vehicle information display apparatus, the display panel comprises an E-ink display panel.

In a second aspect, the present disclosure further provides a vehicle information display system, which comprises a vehicle information display apparatus based on any one of the embodiments as described above.

Optionally, the vehicle information display system can further include an information push terminal, which is configured to communicate at least one of vehicle information and geographic range to the vehicle information display apparatus.

Optionally, the vehicle information display system can further include a server, which is configured, upon receiving a pseudo mobile phone number request carrying an identification for the vehicle information display apparatus, to generate, and then to send to the vehicle information display apparatus, a pseudo mobile phone number corresponding to the identification for the vehicle information display apparatus.

FIG. 1A illustrates a vehicle information display system according to some embodiments of the disclosure. As shown in FIG. 1A, the vehicle information display system 001 includes a vehicle-mounted display apparatus 100, an information push terminal 200, and a server 300. The vehicle-mounted display apparatus 100 is configured to communicate with each of the information push terminal 200 and the server 300, as illustrated by the double-headed arrows in the figure.

In implementation, the vehicle-mounted display apparatus 100 can be a terminal having a display functionality (e.g. a display apparatus) that is mounted in a vehicle and is able to display images to an outside of the vehicle. The information push terminal 200 can be a mobile phone, a computer, a tablet, etc., which can be equipped with an application (APP) that can specifically allow communication between the vehicle-mounted display apparatus 100. The server 300 can be remotely arranged, such as in a cloud, which is configured to communicate with the vehicle-mounted display apparatus 100.

The vehicle-mounted display apparatus 100 can be configured to communicate with the information push terminal 200 via Bluetooth, infrared communication, WIFI (Wireless Fidelity, wireless fidelity), Zigbee (purple bee), or other communication modes. The vehicle-mounted display apparatus 100 can be further configured to communicate with the server via a wireless communication network (e.g. a 2G network, a 3G network, a 4G network, or a 5G network).

Figure 1B:
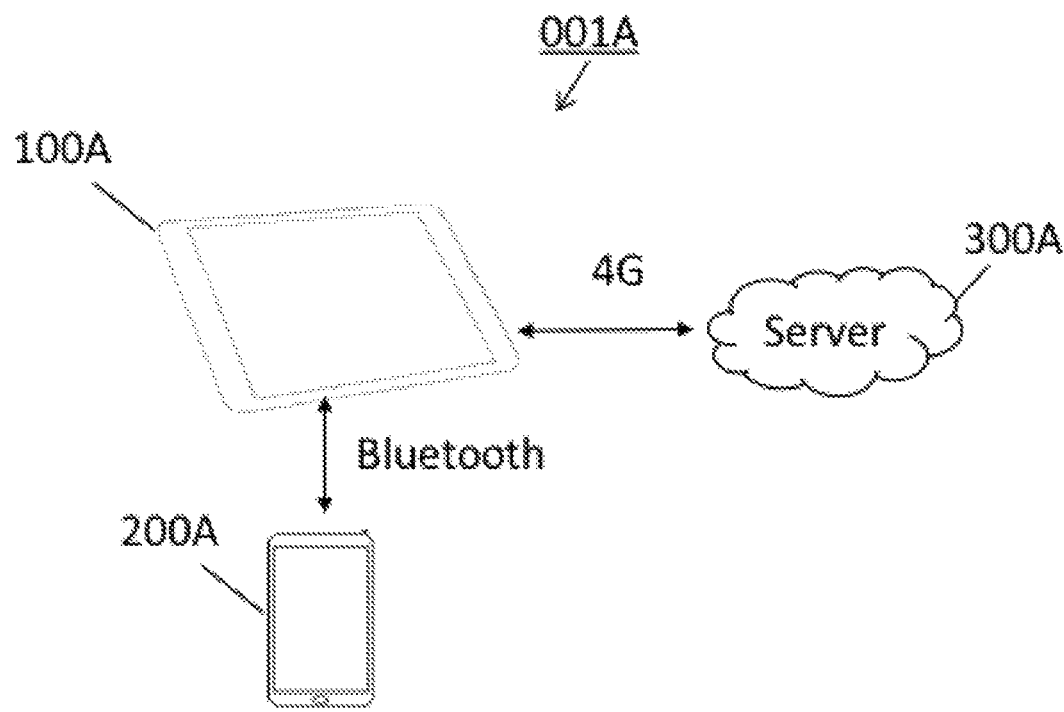
FIG. 1B shows a vehicle information display system according to some specific embodiments of the disclosure.

FIG. 1B illustrates a vehicle information display system according to one specific embodiment of the disclosure. As shown in FIG. 1B, the vehicle information display system 001A substantially comprises a vehicle-mounted display apparatus 100A, a mobile phone 200A, and a cloud server 300A (i.e. server in a cloud), which correspond respectively to the vehicle-mounted display apparatus 100, the information push terminal 200, and the server 300 as shown in FIG. 1A. The vehicle-mounted display apparatus 100A is configured to communicate with the mobile phone 200A via Bluetooth, and with the server 300A via a 4G wireless communication network.

Figure 2A:
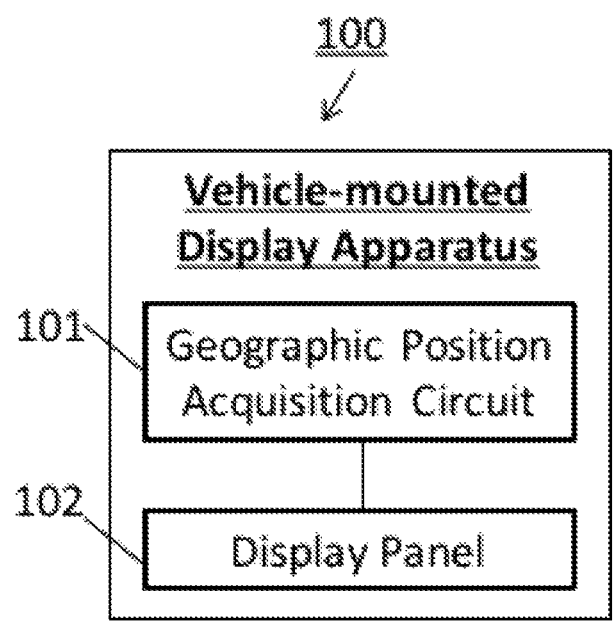
FIG. 2A is a block diagram of a vehicle-mounted display apparatus according to some embodiments of the present disclosure.

FIG. 2A illustrates a block diagram of a vehicle-mounted display apparatus according to some embodiments of the present disclosure. As shown in FIG. 2A, the vehicle-mounted display apparatus 100 includes a geographic position acquisition circuit 101 and a display panel 102.

The geographic position acquisition circuit 101 is configured to acquire geographic position information of the vehicle that specifically indicates a current geographic position of the vehicle. The display panel 102 is configured to display pre-stored (or stored beforehand) vehicle information when and/or if the current geographic position of the vehicle as indicated by the geographic position information acquired by the geographic position acquisition circuit 101 is within a stored or pre-determined geographic range.

In addition to the display panel and the geographic position acquisition circuit, the vehicle-mounted display apparatus further includes a processor and a display panel driving circuit (not shown in FIG. 2A), which are responsible for controlling the information processing involving the geographic position acquisition circuit 101 and the control of the display by the display panel 102

Specifically, the processor is configured to determine whether the current geographic position of the vehicle is within the stored geographic range, and to generate a first control signal if so (i.e. if the current geographic position of the vehicle is within the stored geographic range), and the display panel driving circuit is configured to control the display panel to display the vehicle information upon receiving the first control signal from the processor.

Herein, the stored geographic range is defined as a range of geographic coordinates (i.e. latitude and longitude coordinates) that is stored in a memory which the processor can reference to determine whether the current geographic position of the vehicle is within the stored geographic range. Examples of a geographic range can include a range of latitude coordinates and/or longitude coordinates, and can also include a circular area with a particular set of a latitude coordinates and a longitude coordinates as the center thereof. These above examples are illustrating only and do not limit the scope of the disclosure.

It is noted that according to some embodiments, the display panel driving circuit may be an independent component in the vehicle-mounted display apparatus that is coupled both to the processor and the display panel. Yet according to some other embodiments, the display panel driving circuit may be a component integrated into the display panel. In the following, the vehicle-mounted display apparatus/vehicle information display apparatus will be illustrated and described with embodiments of the vehicle-mounted display apparatus where the display panel driving circuit is integrated into the display panel as examples.

According to one specific embodiment of the present disclosure, the geographic position acquisition circuit 101 comprises a device having a positioning functionality, such as a global positioning system (GPS) functionality, etc., which can directly obtain the above geographic position information of the vehicle from a satellite.

Figure 2B:
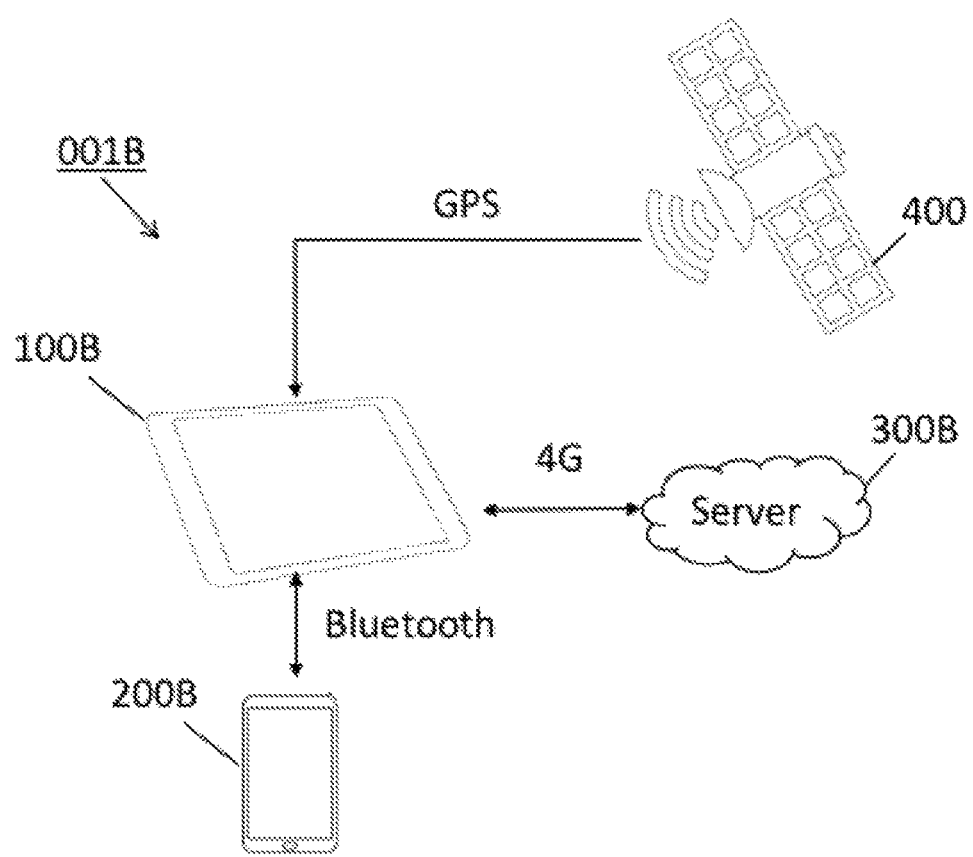
FIG. 2B is a schematic diagram of a vehicle information display system according to one specific embodiment of the present disclosure.

FIG. 2B illustrates a vehicle information display system having a positioning circuit in the vehicle-mounted display apparatus according to one specific embodiment of the disclosure. Similar to the embodiment of the vehicle information display system 001A as illustrated in FIG. 1B, the vehicle information display system 001B as illustrated in FIG. 2B comprises a vehicle-mounted display apparatus 100B as the vehicle-mounted display apparatus 100, a mobile phone 200B as the information push terminal 200, and a cloud server 300B as the server 300.

Furthermore, in the embodiment of the vehicle information display system illustrated in FIG. 2B, the vehicle-mounted display apparatus 100B is configured to communicate with the mobile phone 200B via Bluetooth, and with the cloud sever 300B via a 4G wireless communication network. Additionally, because the geographic position acquisition circuit 101 in the vehicle-mounted display apparatus 100B comprises a GPS positioning circuit (not shown in the figure), the vehicle-mounted display apparatus 100B is thus able to receive a GPS signal from a satellite 400 via the GPS positioning circuit to thereby allow the geographic position information of the vehicle to be acquired.

Figure 2C:
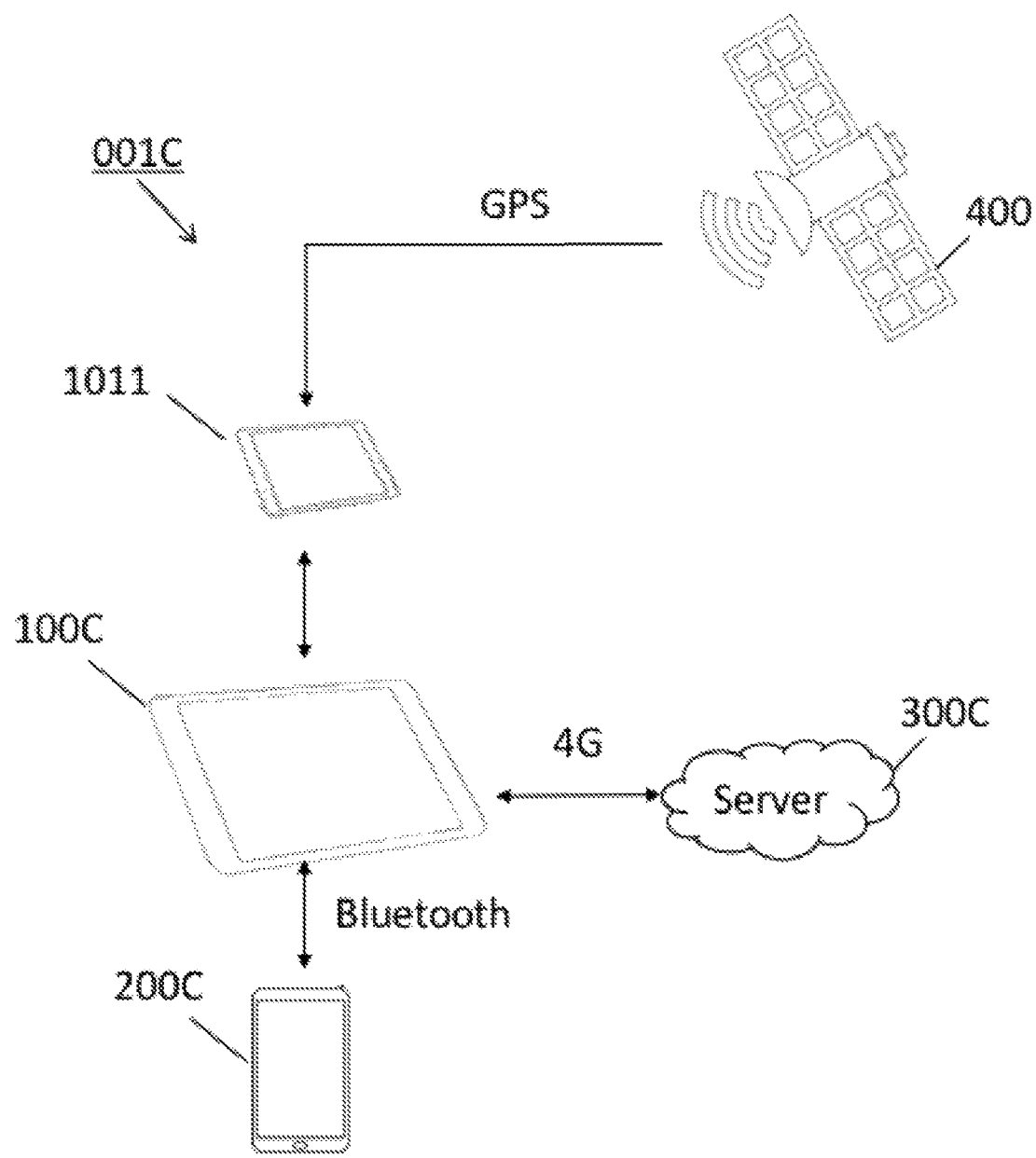
FIG. 2C is a schematic diagram of a vehicle information display system according to another specific embodiment of the present disclosure.

According to another embodiment of the present disclosure, the geographic position acquisition circuit 101 in the vehicle-mounted display apparatus 100 does not have the positioning functionality to directly obtain the geographic position information of the vehicle, but can communicate with an outside independent positioning device, such as an independent GPS device, a vehicle-mounted GPS device, or a cellular phone with GPS functionality in the vehicle, to thereby indirectly obtain the geographic position information of the vehicle from a satellite. One such embodiment of the vehicle-mounted display apparatus 100 is illustrated in FIG. 2C, where the vehicle-mounted display apparatus 100C is configured to communicate with a vehicle-mounted GPS device 1011 via the geographic position acquisition circuit 101 arranged in the vehicle-mounted display apparatus 100C to thereby indirectly obtain the geographic position information of the vehicle from the satellite 400.

During implementation of the vehicle-mounted display apparatus and the vehicle information display system as described above, an attendant or a superintendent in charge of an area (e.g. a living community, a campus of a company, a parking lot, a mall, etc.) can, based on the vehicle information displayed on the display panel 102 of the vehicle-mounted display apparatus 100, verify the identity of a driver/owner of a vehicle before releasing the vehicle to enter into, or stopping the vehicle from entering, the area.

Herein the geographic range can be a range for the area (e.g. the living community, the campus of the company, the parking lot, the mall, etc.) as described above. The vehicle information can include at least one of vehicle license information or a pseudo mobile phone number. The vehicle license information can include a name, a professional position, a photo, etc., of the driver/owner of the vehicle. The pseudo mobile phone number is a mobile phone number bundled with a real mobile phone number of the driver/owner, configured such that when the pseudo mobile phone number is called by a primary calling terminal, the wireless communication network can establish a connection between the primary calling terminal and the real mobile phone number of the owner via a call transfer technique.

In summary, by means of the vehicle-mounted display apparatus 100 disclosed herein as well as the vehicle information display system 001 described above, the vehicle information can be displayed by the vehicle-mounted display apparatus only when the vehicle is within the predetermined geographic range, i.e. an area (e.g. a living community, a campus of a company, a parking lot, a mall, etc.) where verification of the identity of the driver/owner of the vehicle is needed. As such, the risk of privacy leak can be greatly lowered.

Figure 2D:
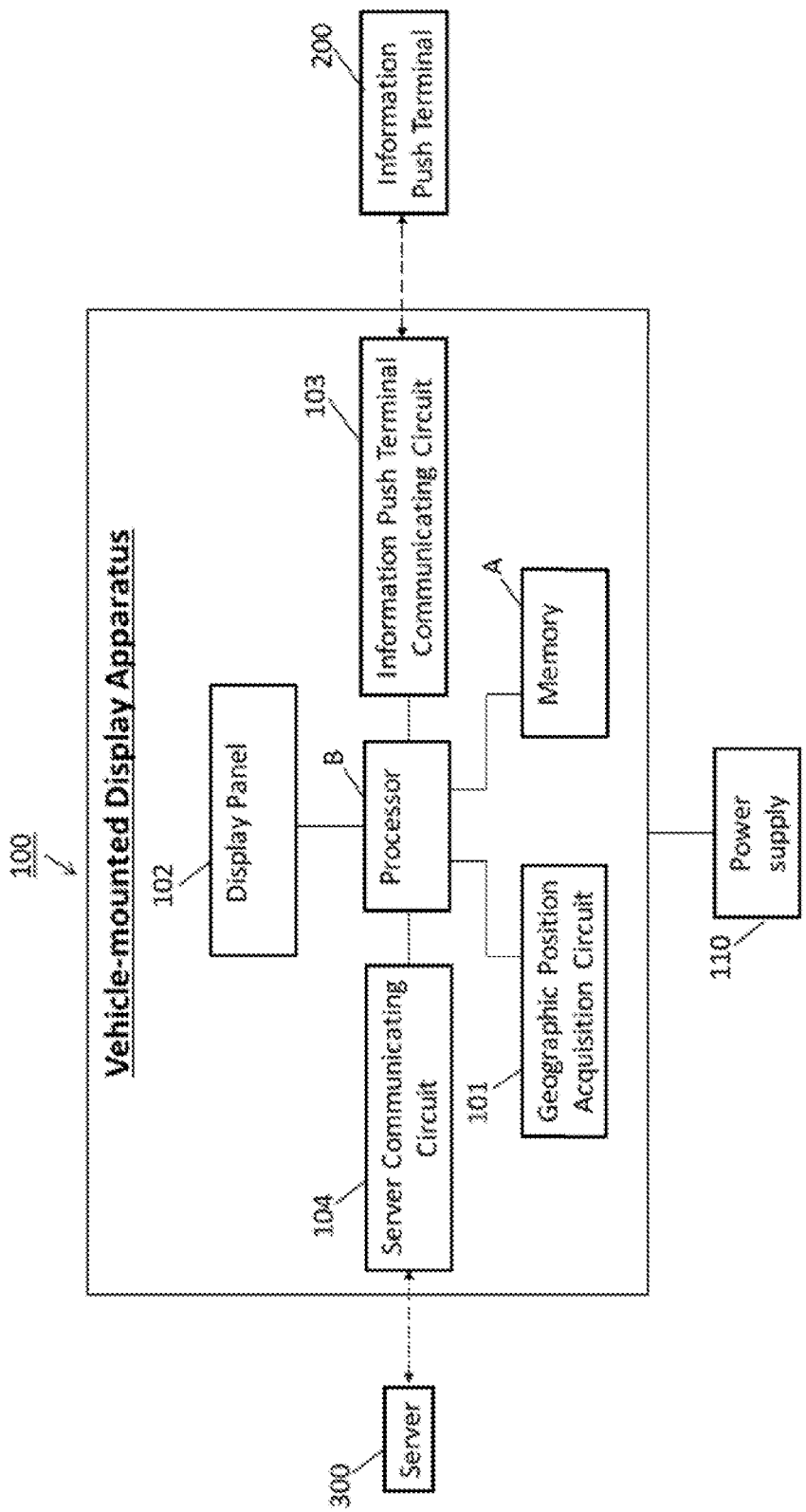
FIG. 2D is a block diagram of a vehicle-mounted display apparatus according to some other embodiments of the present disclosure.

FIG. 2D indicates a block diagram of a vehicle-mounted display apparatus 100 in the vehicle information display system according to some embodiments of the disclosure. As shown in FIG. 2D, the vehicle-mounted display apparatus 100 can further comprise, in addition to the geographic position acquisition circuit 101 and the display panel 102, an information push terminal communicating circuit 103, a server communicating circuit 104, a memory A, and a processor B.

The processor B is coupled respectively to the geographical position acquisition circuit 101, the display panel 102, the first receiving sub-circuit 103, the first transmitting and receiving circuit 104, and the memory A. The processor B is configured to control each of the geographical position acquisition circuit 101, the display panel 102, the first receiving sub-circuit 103, and the first transmitting and receiving circuit 104 to respectively perform an operation corresponding thereto. The information push terminal communicating circuit 103 is configured to communicate with the information push terminal 200.

According to some embodiments, the information push terminal communicating circuit 103 is configured to specifically receive the vehicle information from the information push terminal 200, and then to store the vehicle information in the memory A upon receiving the vehicle information. Optionally, the vehicle information comprises vehicle license information. It is noted that the vehicle license information can include a photo of the vehicle license, which contains private information about the driver/ owner including, for example, a name, a professional position, a photo, etc., of the driver/owner.

According to some other embodiments, the information push terminal communicating circuit 103 is configured to receive the pre-determined geographic range from the information push terminal 200, and then to store the geographic range in the memory A upon receiving the geographic range.

According to yet some other embodiments, the information push terminal communicating circuit 103 is configured to receive both the vehicle information and the geographic range, optionally from the information push terminal 200, and then to store both the vehicle information and the geographic range in the memory A upon receipt of the vehicle information and the geographic range.

During implementation, the information push terminal communicating circuit 103 can be configured to communicate with the information push terminal 200 through Bluetooth, infrared communication, WIFI (Wireless Fidelity, wireless fidelity), Zigbee (purple bee), or other communication modes.

The server communicating circuit 104 is configured to communicate with the server 300. According to some embodiment, the server communicating circuit 104 is configured to send a pseudo mobile phone number acquisition request to the server 300 through a communication network, such as a wireless communication network or an internet. The pseudo mobile phone number acquisition request can be configured to carry an identification for the vehicle-mounted display apparatus 100. Herein the wireless communication network can be a 2G network, a 3G network, a 4G network, or a 5G network.

Figure 2E:
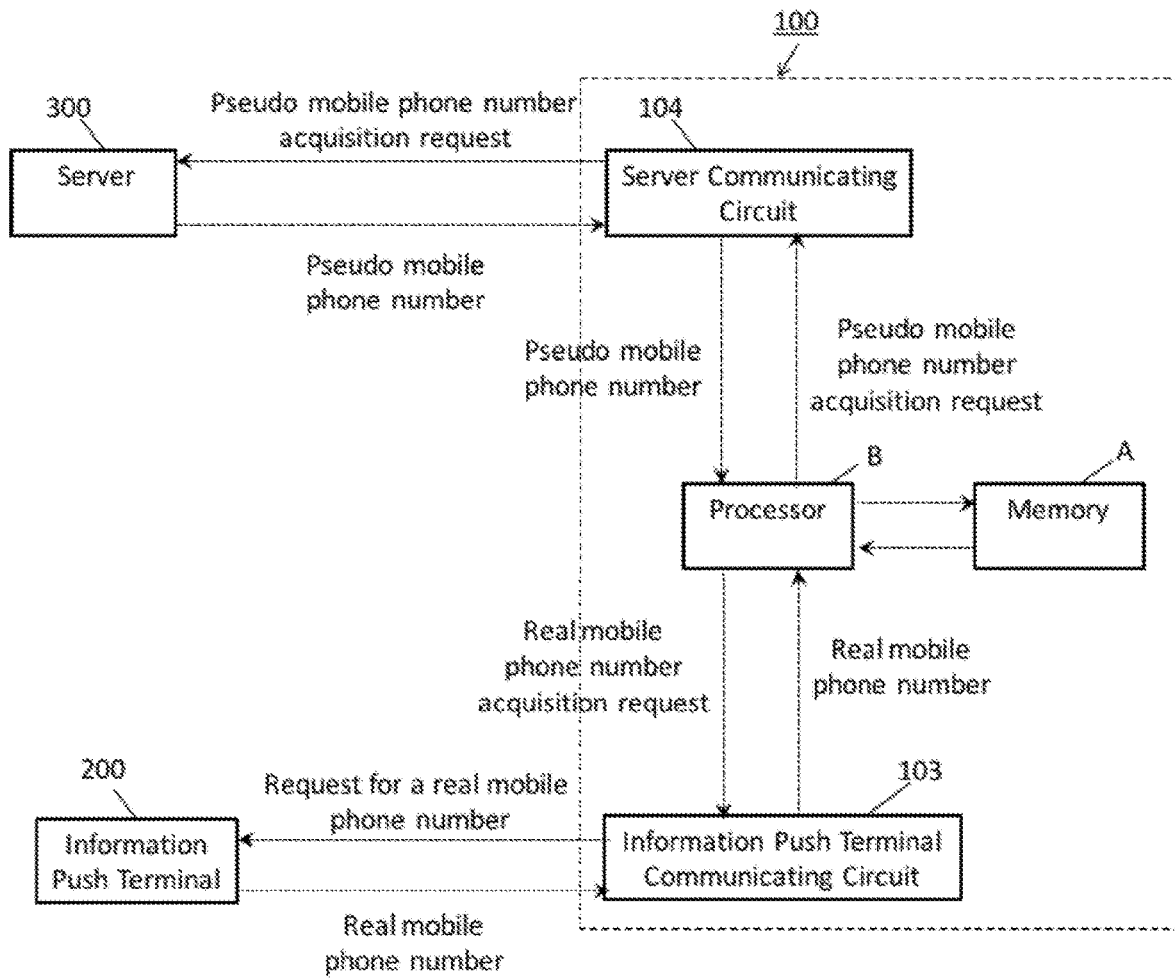
FIG. 2E illustrates a working process of the vehicle information display system according to some embodiments of the disclosure.

FIG. 2E illustrates a working process of the vehicle information display system according to some embodiments of the disclosure.

As shown in FIG. 2E, upon receiving the pseudo mobile phone number acquisition request from the server communicating circuit 104 of the vehicle-mounted display apparatus 100, the server 300 can generate a pseudo mobile phone number, which can be a string of random digits that conform to a preset rule. The preset rule can, for example, set a preset number of, or a starting digit for, the string of random digits, etc. There is no limitation to the specific format of the pseudo mobile phone number.

After generating the pseudo mobile phone number, the server 300 can store the pseudo mobile phone number and the real mobile phone number corresponding to the identification for the vehicle-mounted display apparatus 100, and return the pseudo mobile phone number to the vehicle-mounted display apparatus 100. According to one embodiment of the disclosure, the server communicating circuit 104 is configured to also receive the pseudo mobile phone number that is returned by the server 300.

According to one specific embodiment of the disclosure, the server 300 can beforehand store the real mobile phone number as mentioned above (i.e. the real mobile phone number corresponding to the identification for the vehicle-mounted display apparatus 200). For example, the information push terminal communicating circuit 103 of the vehicle-mounted display apparatus 100 can beforehand receive the real mobile phone number sent from the information push terminal 200. The server communicating circuit 104 can, upon receiving the real mobile phone number from the information push terminal communicating circuit 103, send the real mobile phone number to the server 300. Then the server 300 can, upon receiving the real mobile phone number from the server communicating circuit 104 of the vehicle-mounted display apparatus 100, store the real mobile phone number and the identification for the vehicle-mounted display apparatus 100. As such, the server 300 can correspondingly store the pseudo mobile phone number and the real mobile phone number that has been stored beforehand in the server 300.

According to another embodiment of the disclosure, the server 300 does not beforehand store the real mobile phone number. The pseudo mobile phone number acquisition request sent by the server communicating circuit 104 of the vehicle-mounted display apparatus 100 can carry the real mobile phone number, and the server can correspondingly store the real mobile phone number and the identification for the vehicle-mounted display apparatus 100 to thereby realize a corresponding storage of the pseudo mobile phone number and the real mobile phone number in the server.

In one illustrating example, the information push terminal communicating circuit 103 can receive the real mobile phone number beforehand sent from the information push terminal 200, and then the processor B can store the real mobile phone number in the memory A. When the pseudo mobile phone number acquisition request is about to be transmitted to the server 300, the processor B can generate the pseudo mobile phone number acquisition request based on the real mobile phone number that has been stored in the memory A. The server communicating circuit 104 can then send the pseudo mobile phone number acquisition request carrying the real mobile phone number to the server 300. The server 300 can thus correspondingly store the real mobile phone number and the identification for the vehicle-mounted display apparatus 100 to thereby realize a corresponding storage of the pseudo mobile phone number and the real mobile phone number in the server.

Alternatively, in another illustrating example which is also shown in FIG. 2E, the information push terminal communicating circuit 103 can send a request for a real mobile phone number to the information push terminal 200 before the server communicating circuit 104 sends the pseudo mobile phone number acquisition request to the server 300. Upon receiving the request for the real mobile phone number, the information push terminal 200 can return the real mobile phone number to the information push terminal communicating circuit 103.

Upon the information push terminal communicating circuit 103 receiving the real mobile phone number, the processor B can generate the pseudo mobile phone number acquisition request based on the real mobile phone number that has been returned by the information push terminal 200. The server communicating circuit 104 can then send the pseudo mobile phone number acquisition request carrying the real mobile phone number to the server 300. The server 300 can thus correspondingly store the real mobile phone number and the identification for the vehicle-mounted display apparatus 100 to thereby realize a corresponding storage of the pseudo mobile phone number and the real mobile phone number in the server 300.

According to some embodiments, the processor B can control the server communicating circuit 104 to send the pseudo mobile phone number acquisition request to the server 300 when the geographic position of the vehicle as indicated by the geographic position information is within the pre-determined geographic range. According to some other embodiments, the processor B can alternatively control the server communicating circuit 204 to send the pseudo mobile phone number acquisition request to the server when the vehicle is started. There are no limitations herein.

According to some embodiments, the processor B can control the display panel 102 to display the pseudo mobile phone number that is returned by the server 300 when the geographic position of the vehicle as indicated by the geographic position information is within the pre-determined geographic range. The processor B can further control the display panel 102 to display the pseudo mobile phone number returned by the server 300 when the speed of the vehicle is smaller than, or substantially equal to a preset threshold speed that is set beforehand, for example, by a technician. For example, the processor B can control the display panel 102 to display the pseudo mobile phone number when the vehicle is stopped and/or locked off. There are no limitations herein.

During implementation, the processor B can control the display panel 102 to display the vehicle license information when displaying the pseudo mobile phone number. For example, the processor B can control the display panel 102 to display both the vehicle license information and the pseudo mobile phone number when the geographic position of the vehicle as indicated by the geographic position information is within the pre-determined geographic range.

Optionally, the display panel 102 can include an E-ink display panel. The E-ink display panel can still display images even after being disconnected from a power source. When displaying the vehicle information, the processor B can control the E-ink display panel to be connected to a power source and then to be refreshed for displaying the vehicle information. Then the processor B can control the E-link display panel to be disconnected from the power source, whereas the vehicle information is still displayed by the E-link display panel even after electrical disconnection from the power source.

Because of the advantageous feature of an E-ink display panel to display the vehicle information even after electrical disconnection from the power source, the E-ink display panel consume little energy to thereby result in a reduced energy consumption by the vehicle-mounted display apparatus 100. In addition, an E-ink display panel has a relatively low light reflection, which can ensure a driving safety of a driver of the vehicle who is frequently influenced negatively by the light reflection.

According to some embodiments as illustrated in FIG. 2D, the vehicle-mounted display apparatus 100 is electrically connected with a power supply 110, which powers the operation of each of the processor B, the memory A, the geographic position acquisition circuit 101, the display panel 102, the information push terminal communicating circuit 103, and the server communicating circuit 104. Optionally, the power supply comprises a battery.

Figure 2F:
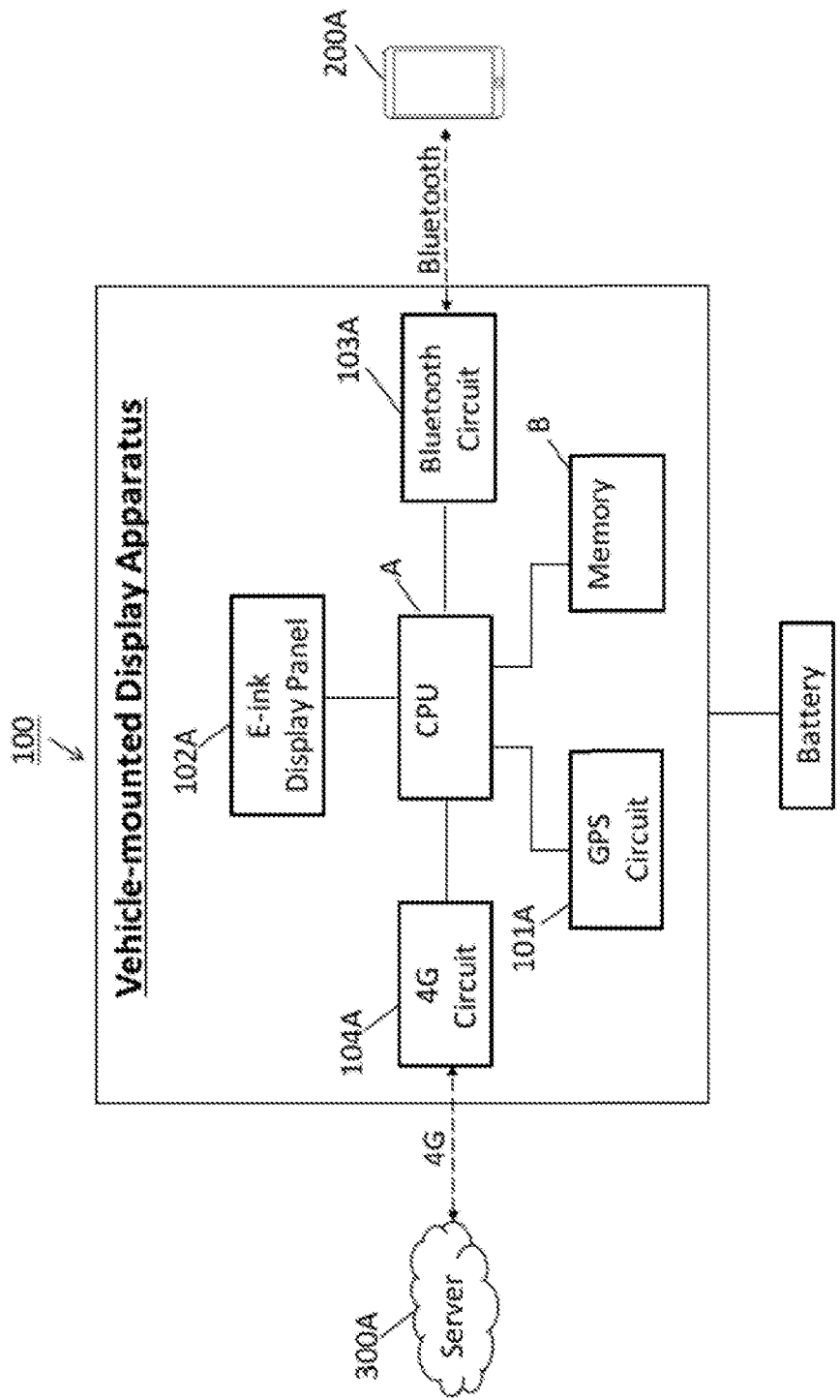
FIG. 2F illustrates one specific embodiment of the vehicle-mounted display apparatus.

FIG. 2F illustrates one specific embodiment of the vehicle-mounted display apparatus 100. In the vehicle-mounted display apparatus 100 as illustrated in FIG. 2F, the display panel 102 comprises an E-ink display panel 102A, the geographic position acquisition circuit 101 comprises a GPS circuit 101A, the information push terminal communicating circuit 103 comprises a Bluetooth circuit 103A, the server communicating circuit 104 comprises a 4G circuit 104A, and the processor B comprises a CPU. The 4G circuit 104A is configured to communicate with the server in the cloud 300A via a 4G communication network, and the Bluetooth circuit 203A is configured to communicate with the mobile phone (i.e. the information push terminal) 200A via a Bluetooth connection.

In summary, by means of the vehicle-mounted display apparatus 100 described above, the vehicle information can be displayed only when and if the vehicle is within the pre-determined geographic range, i.e. an area (e.g. a living community, a campus of a company, a parking lot, a mall, etc.) where verification of the identity of the driver/owner of the vehicle is needed. As such, the risk of privacy leak can be greatly lowered.

Furthermore, the vehicle information displayed by the vehicle-mounted display apparatus 200 can include a pseudo mobile phone number rather than a real mobile phone number, thereby the risk of privacy leak can be greatly lowered. At the same time, when the pseudo mobile phone number is called by a primary calling terminal, the wireless communication network can still establish a connection between the primary calling terminal and the real mobile phone number of the owner. As such, the display of the pseudo mobile phone number has no influence on the normal communication of the driver.

Figure 3:
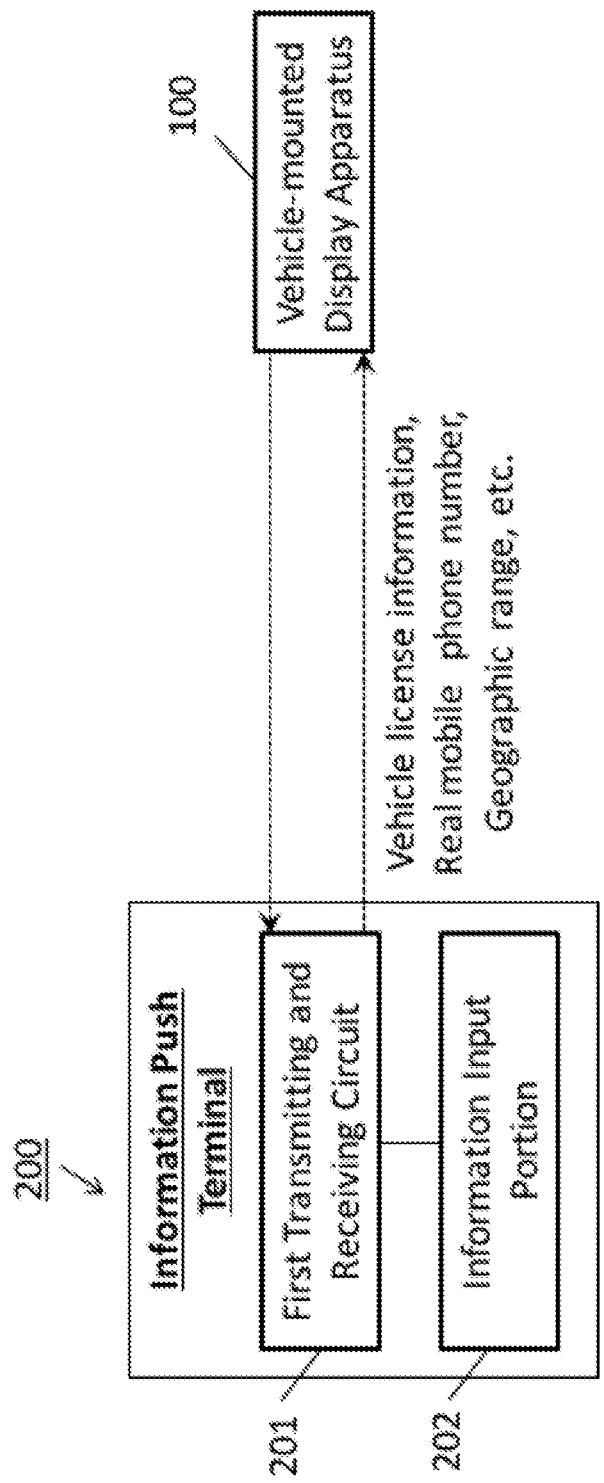
FIG. 3 illustrates a block diagram of an information push terminal 200 and its communication with the vehicle-mounted display apparatus according to some embodiments of the disclosure.

FIG. 3 illustrates a block diagram of an information push terminal 200 and its communication with the vehicle-mounted display apparatus 100 according to some embodiments of the disclosure.

As shown in FIG. 3, the information push terminal 200 includes a first transmitting and receiving circuit 201 and an information input portion 202.

The first transmitting and receiving circuit 201 is configured to communicate with the vehicle-mounted display apparatus 100, and optionally to communicate with the information push terminal communicating circuit 103 of the vehicle-mounted display apparatus 100 specifically, to thereby allow the information such as the vehicle information and/or the geographic range to be transmitted from the information push terminal 200 to the vehicle-mounted display apparatus 100 for display or processing. The communication between the first transmitting and receiving circuit 201 of the information push terminal 200 and the information push terminal communicating circuit 103 of the vehicle-mounted display apparatus 100 can be through Bluetooth, infrared communication, WIFI, Zigbee, or other communication modes.

According to some embodiments, the vehicle information includes vehicle license information, which is configured to be displayed by the vehicle-mounted display apparatus 100 when the geographic position of the vehicle as indicated by the geographic position information is within the pre-determined geographic range. Herein the geographic position information is configured to indicate where the vehicle is (i.e. the geographic position of the vehicle) at the moment.

The pre-determined geographic range can be a living community, a campus of a company, a parking lot, a mall, etc.) where verification of the identity of the owner of the vehicle is needed. The vehicle license information can comprise a photo of the vehicle license, and can contain information such as a name, a professional position, a photo, etc., of the owner.

The information input portion 202 of the information push terminal 200 can be configured to prepare information to be pushed to the vehicle-mounted display apparatus 100. Herein the information can include the vehicle license information that is inputted by the driver of the vehicle.

The information prepared by the information input portion 202 can also include the geographic range. For example, the information push terminal 200 can display a map and receive a closed graph drawn on the map by the user, and the information push terminal 200 can treat a range on the map that is enclosed by the closed graph as the pre-determined geographic range. Alternatively, the information push terminal 200 can be configured to display a map and to receive a position where the driver clicks on the map (i.e. a position of the click point), and the information push terminal 200 can treat a range in the surrounding of the click point as the pre-determined geographic range. Further alternatively, the information push terminal 200 can be configured to receive a text information from a user, and obtain the pre-determined geographic range based on the text information.

The information prepared by the information input portion 202 can further include other information such as graphics and texts, which can, by means of a communication between the first transmitting and receiving circuit 201 of the information push terminal 200 and the information pushing terminal communicating circuit 103 of the vehicle-mounted display apparatus 100, be displayed by the vehicle-mounted display apparatus 200.

Optionally, the information push terminal 200 can be a mobile phone, and the information prepared by the information input portion 202 can thus further include the real mobile phone number of the mobile phone of the driver, which can be displayed by the vehicle-mounted display apparatus 100.

In summary, by means of the information input portion 202 and the first transmitting and receiving circuit 201, the information push terminal 200 can prepare and send the vehicle information (e.g. the vehicle license information), the geographic range, and other information as well, to the vehicle-mounted display apparatus 100. Then the vehicle-mounted display apparatus 100 can be configured to display the information when the vehicle is within the pre-determined geographic range. As such, the vehicle license information is displayed only when the vehicle is at a checkpoint of a living community or a company campus, etc., leading to a greatly reduced risk of privacy leak for the user.

Figure 4A:
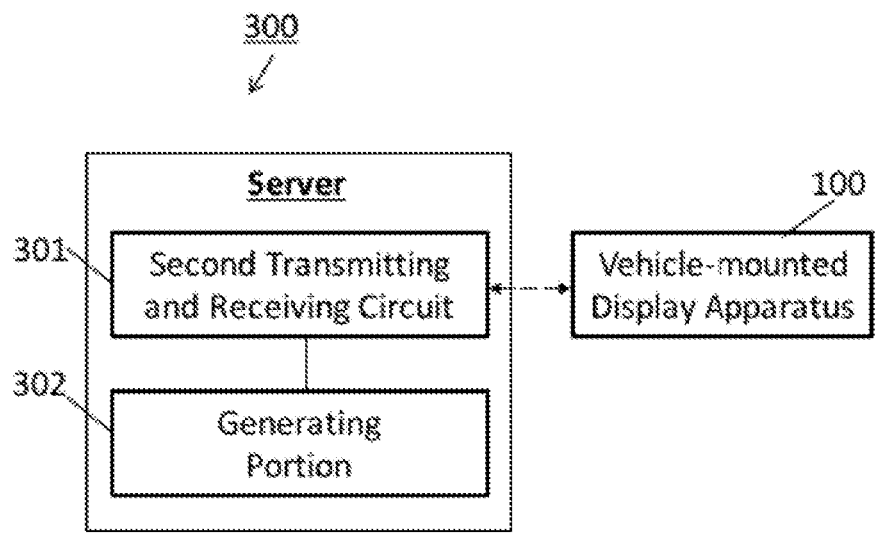
FIG. 4A illustrates a block diagram of a server according to some embodiments of the disclosure.

FIG. 4A is a block diagram of a server 300 according to some embodiments of the disclosure. As shown in the figure, the server 300 comprises a second transmitting and receiving circuit 301 and a generating portion 302.

The second transmitting and receiving circuit 301 is configured to allow the server 300 to communicate with the vehicle-mounted display apparatus 100 through, for example, the server communicating circuit 104 in the vehicle-mounted display apparatus 100. Specifically, according to some embodiments, the second transmitting and receiving circuit 301 of the server 300 is configured to receive from the vehicle-mounted display apparatus 100 a pseudo mobile phone number acquisition request carrying an identification for the vehicle-mounted display apparatus 100, and then to send a pseudo mobile phone number that has been generated by the generating portion 302 to the vehicle-mounted display apparatus 100.

The generating portion 302 is configured, upon the second transmitting and receiving circuit 301 receiving the pseudo mobile phone number acquisition request from the vehicle-mounted display apparatus 100, to generate the pseudo mobile phone number, to in turn allow the server 300 to correspondingly store the pseudo mobile phone number that has been generated and the real mobile phone number that has been bundled with the identification for the vehicle-mounted display apparatus 100.

Figure 4B:
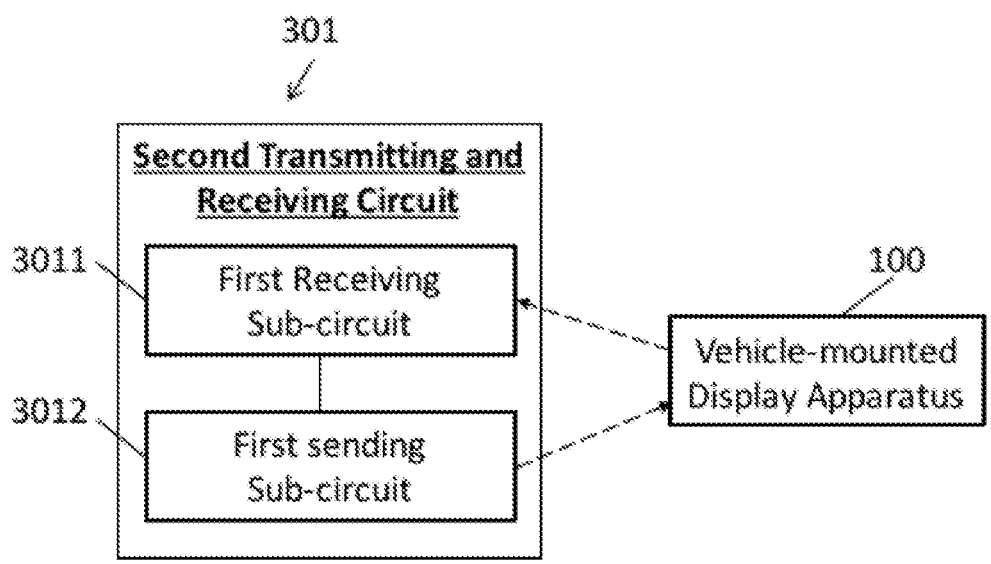
FIG. 4B illustrates a block diagram of the second transmitting and receiving circuit according to some specific embodiment of the disclosure.

According to some embodiments as illustrated in FIG. 4B, the second transmitting and receiving circuit 301 comprises a first receiving sub-circuit 3011 and a first sending sub-circuit 3012, which are configured to receive the pseudo mobile phone number acquisition request from, and to send the pseudo mobile phone number to, the vehicle-mounted display apparatus 100, respectively.

In practice, the second transmitting and receiving circuit 301, or optionally either of the first receiving sub-circuit 3011 and the first sending sub-circuit 3012 therein, can be configured to communicate with the vehicle-mounted display apparatus 100 via a wireless communication network, an internet, or other communication modes.

The pseudo mobile phone number generated by the generating portion 302 in the server 300 can be a string of random digits that conform to a preset rule. The preset rule can, for example, set a preset number or a starting digit for the string of random digits, etc. There is no limitation herein.

According to some embodiment, the server 300 can store the real mobile phone number beforehand. For example, the vehicle-mounted display apparatus 100 can receive the real mobile phone number sent from the information push terminal 200 beforehand, and can, upon receiving the real mobile phone number, send the real mobile phone number to the server 300. In the server 300, the second transmitting and receiving circuit 301 can receive the real mobile phone number to thereby allow the server 300 to correspondingly bundle the real mobile phone number with the identification for the vehicle-mounted display apparatus 100. After the generating portion 302 generates the pseudo mobile phone number upon receiving the pseudo mobile phone number acquisition request carrying the identification for the vehicle-mounted display apparatus 100, the pseudo mobile phone number can be correspondingly bundled with the real mobile phone number based on the same identification for the vehicle-mounted display apparatus 100.

According to some other embodiment, the server 300 does not store the real mobile phone number. As such, the pseudo mobile phone number acquisition request can directly contain the real mobile phone number. The server 300 can correspondingly store the real mobile phone number and the identification for the vehicle-mounted display apparatus 100 to thereby realize a corresponding bundling of the pseudo mobile phone number and the real mobile phone number in the server.

In summary, the server 300 as described above can generate a pseudo mobile phone number upon receiving the pseudo mobile phone number acquisition request from the vehicle-mounted display apparatus 100, and can then send the pseudo mobile phone number to the vehicle-mounted display apparatus 100 for display. Because the pseudo mobile phone number is not the real mobile phone number, there is little risk for privacy leak.

Figure 4C:
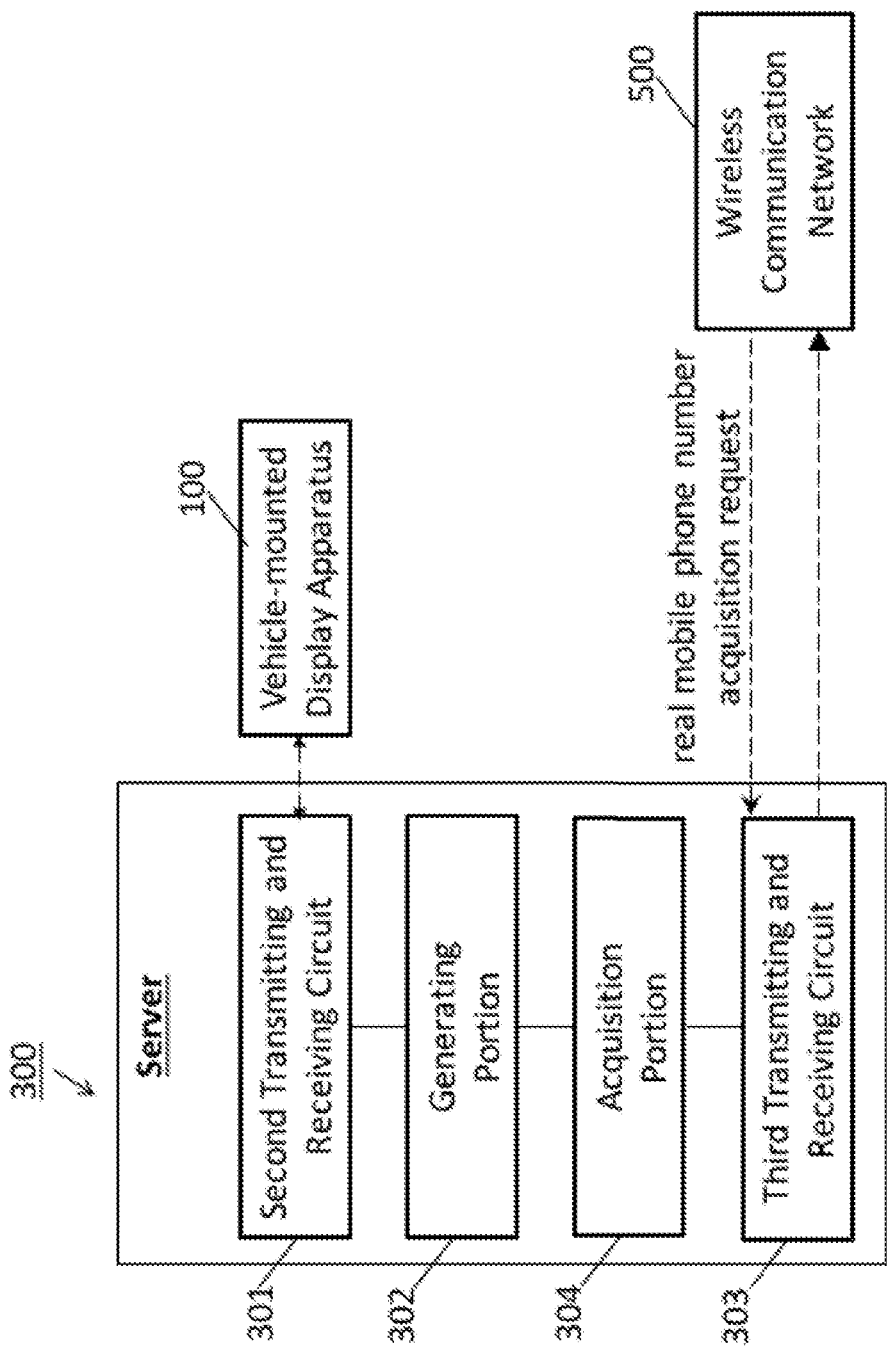
FIG. 4C illustrates a block diagram of a server and its communication with the vehicle-mounted display apparatus and the wireless communication network according to some specific embodiment of the disclosure.

FIG. 4C illustrates a block diagram of a server 300 and its communication with the vehicle-mounted display apparatus 100 and the wireless communication network 500 according to some specific embodiment of the disclosure. As shown in FIG. 4C, the server 300 further comprises, in addition to the second transmitting and receiving circuit 301 and the generating portion 302, a third transmitting and receiving circuit 303, and an acquisition portion 304.

The third transmitting and receiving circuit 303 is configured to communicate with a wireless communication network 500. Specifically, the third transmitting and receiving circuit 303 is configured to receive from the wireless communication network 500 a real mobile phone number acquisition request carrying the pseudo mobile phone number, and then to send the real mobile phone number to the wireless communication network 500. Within the server 300, the third transmitting and receiving circuit 303 is configured to transmit the real mobile phone number acquisition request to the acquisition portion 304.

The acquisition portion 304 is configured, upon receiving the real mobile phone number acquisition request from the third transmitting and receiving circuit 303, to obtain the real mobile phone number that has been correspondingly stored with the pseudo mobile phone number in the server 300, and then to sends the real mobile phone number to the third transmitting and receiving circuit 303.

Figure 4D:
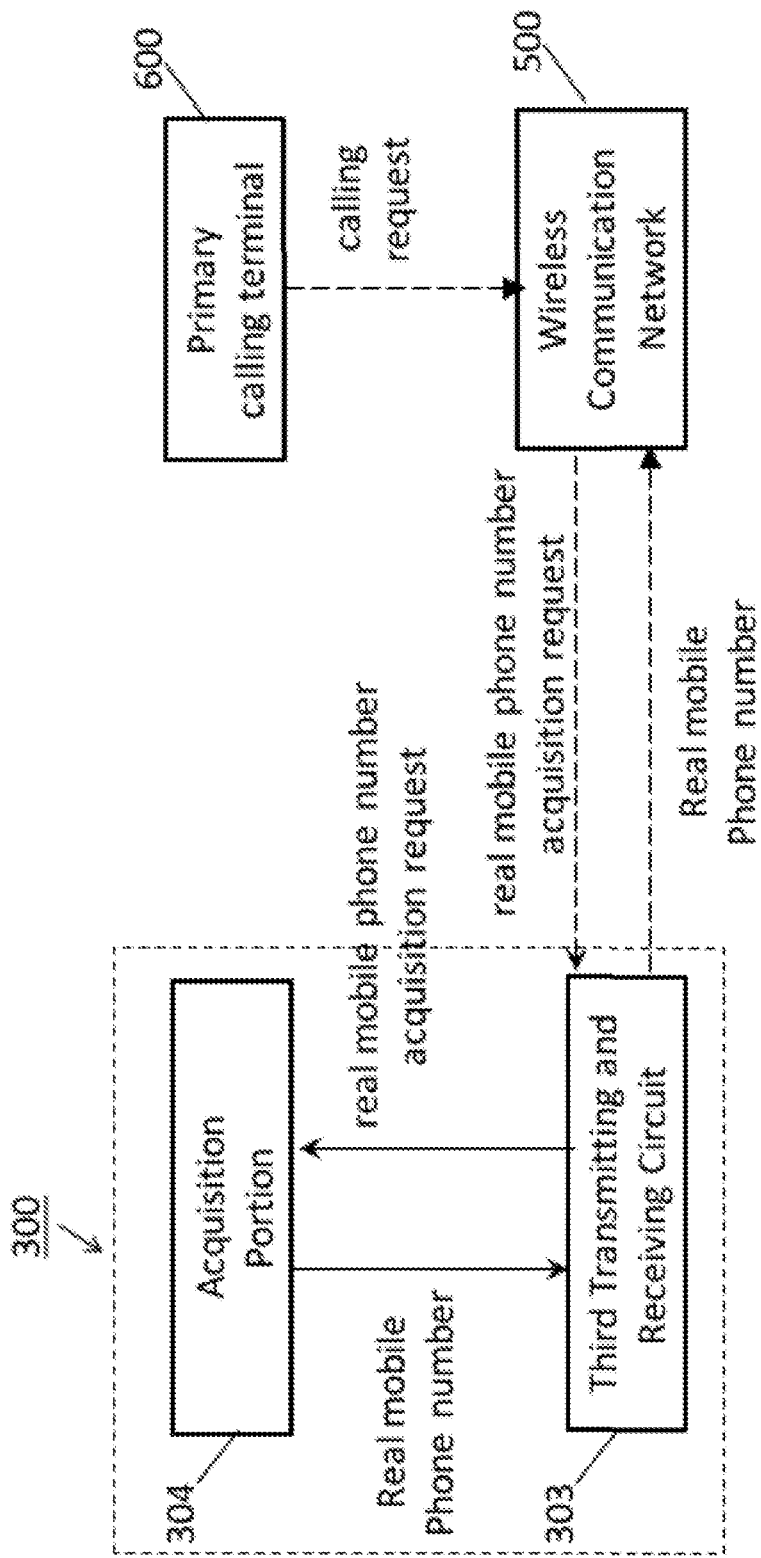
FIG. 4D illustrates a process of the server communicating with the wireless communication network and the primary calling terminal according to some specific embodiment of the disclosure.

FIG. 4D illustrates a process of the server 300 communicating with the wireless communication network 500 and the primary calling terminal 600. As shown in FIG. 4D, when the wireless communication network 500 receives a calling request from a primary calling terminal 600 and detects that the calling request carries the pseudo mobile phone number, the wireless communication network 500 sends a real mobile phone number acquisition request to the server 300, or more specifically the third transmitting and receiving circuit 303 of the server 300.

Then the third transmitting and receiving circuit 303 further sends the real mobile phone number acquisition request to the acquisition portion 304. After the acquisition portion 304 obtains a real mobile phone number based on the corresponding storage of the pseudo mobile phone number and the real mobile phone number in the server 300, to further send the real mobile phone number to the wireless communication network 500 such that the wireless communication network 500 can establish a calling connection between the primary calling terminal 600 and a called terminal associated with the real mobile phone number (not shown in the figure). Herein the called terminal can be the mobile terminal (cell phone) of the driver, but can also be another terminal.

Figure 4E:
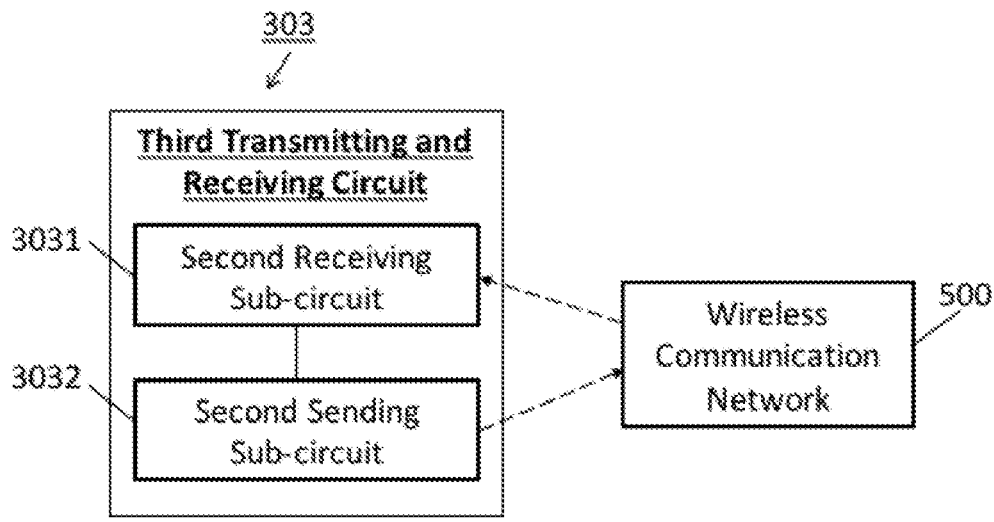
FIG. 4E illustrates a block diagram of a third transmitting and receiving circuit in the server and its communication with the wireless communication network according to some specific embodiment of the disclosure.

According to some embodiments, the third transmitting and receiving circuit 303 comprises a second receiving sub-circuit 3031 and a second sending sub-circuit 3032, as illustrated in FIG. 4E.

The second receiving sub-circuit 3031 is configured to receive from the wireless communication network 500 a real mobile phone number acquisition request carrying the pseudo mobile phone number, when the wireless communication network 500 receives a calling request from a primary calling terminal (not shown in FIG. 4E) and detects that the calling request carries the pseudo mobile phone number.

The second sending sub-circuit 3032 is configured, after the acquisition portion 304 obtains a real mobile phone number based on the corresponding storage of the pseudo mobile phone number and the real mobile phone number in the server 300, to send the real mobile phone number to the wireless communication network 500 such that the wireless communication network 500 can establish a calling connection between the primary calling terminal and a called terminal associated with the real mobile phone number.

Optionally, when a phone number is dialed by someone through the primary calling terminal 600, the primary calling terminal 600 can send a calling request comprising a phone number to a base station of the wireless communication network 500. The base station of the wireless communication network 500 can detect whether the phone number is the pseudo mobile phone number. Herein the wireless communication network 500 can be a cellular network. Because the pseudo mobile phone number is a string of random digits that conforms to a preset rule, the base station can detect whether the phone number conforms with the preset rule to thereby determine whether the phone number is the pseudo mobile phone number.

When the base station of the wireless communication network 500 determines that the phone number is a pseudo mobile phone number, it can send a real mobile phone number acquisition request comprising the pseudo mobile phone number (i.e. the phone number that has been dialed) to the server 300. The second receiving sub-circuit 3031 of the third transmitting and receiving circuit 303 in the server 300 can receive the real mobile phone number acquisition request from the base station of the wireless communication network 500, and the acquisition portion 304 in the server 300 can query the real mobile phone number corresponding to the pseudo mobile phone number carried in the real mobile phone number acquisition request. The second sending sub-circuit 3032 of the third transmitting and receiving circuit 303 in the server 300 can then send the real mobile phone number to the base station of the wireless communication network 500 to thereby allow the establishment of the calling connection between the primary calling terminal and a called terminal (i.e. the terminal of the driver) associated with the real mobile phone number.

In summary, the server 300 as described above can generate a pseudo mobile phone number upon receiving the pseudo mobile phone number acquisition request from the vehicle-mounted display apparatus 100, and can then send the pseudo mobile phone number to the vehicle-mounted display apparatus 100 for display. Because the pseudo mobile phone number is not the real mobile phone number, there is little risk for privacy leak.

Furthermore, after the primary calling terminal 600 dials the pseudo mobile phone number, the wireless communication network 500 can establish a calling connection between the primary calling terminal 600 and a called terminal (i.e. the terminal of the driver) associated with the real mobile phone number. As such, the display of the pseudo mobile phone number has no influence on the normal calling to or by the driver of the vehicle.

In another aspect, the present disclosure provides a method for displaying information of a vehicle (i.e. vehicle information display method) utilizing the vehicle-mounted display apparatus as described above.

The method comprises the following steps:
obtaining a current geographic position of the vehicle; and
determining whether the current geographic position of the vehicle is within a stored geographic range; and if so,
displaying the vehicle information.

According to some embodiments of the method, prior to the displaying the vehicle information, the method further comprises a step of:
obtaining at least one of the vehicle information and the geographic range from an information push terminal.

Herein, the vehicle information can comprise at least one of vehicle license information and a pseudo mobile phone number.

According to some embodiments of the method where the vehicle information comprises a pseudo mobile phone number, prior to the displaying the vehicle information, the method further comprises:
sending a pseudo mobile phone number request carrying an identification for the display apparatus to a server;
generating the pseudo mobile phone number corresponding to the identification for the display apparatus in the server; and
receiving the pseudo mobile phone number from the server.

Optionally, after the generating the pseudo mobile phone number corresponding to the identification for the display apparatus in the server, the method further includes:
correspondingly bundling the pseudo mobile phone number with a real mobile phone number in the server.

Herein, optionally the real mobile phone number can be beforehand stored in the server.

Alternatively, the real mobile phone number is not beforehand stored in the server, and the real mobile phone number is carried in the pseudo mobile phone number request.

According to some embodiments, after the correspondingly bundling the pseudo mobile phone number with a real mobile phone number in the server, the method further includes the following steps:

a wireless communication network sending a real mobile phone number request carrying the pseudo mobile phone number to the server upon receiving a calling request from the primary calling terminal;

the server obtaining the real mobile phone number corresponding to pseudo mobile phone number; and the server sending the real mobile phone number to the wireless communication network to thereby establish a calling between the primary calling terminal and a mobile phone having the real mobile phone number.

According to some embodiments of the method, the sending a pseudo mobile phone number request carrying an identification for the display apparatus to a server is performed if the current geographic position of the vehicle is within the stored geographic range.

According to some embodiments of the method, the displaying the vehicle information comprises:

obtaining a current speed of the vehicle;

determining if the current speed of the vehicle is lower than a threshold speed; and if so displaying the vehicle information.

According to some other embodiments of the method, the displaying the vehicle information comprises:

determining whether a locked instruction is received from the vehicle; and if so displaying the vehicle information.

Figure 5:
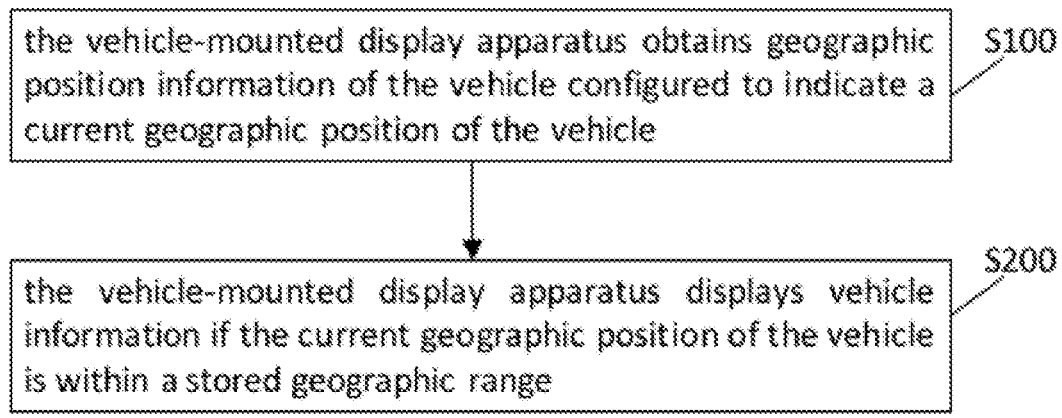
FIG. 5 illustrates a flow chart of a vehicle information display method according to some embodiments of the disclosure.

FIG. 5 illustrates a flow chart of a vehicle information display method according to some embodiments of the disclosure. As shown in FIG. 5, the vehicle information display method comprises the following steps S100 and S200.

S100: the vehicle-mounted display apparatus obtains geographic position information of the vehicle configured to indicate a current geographic position of the vehicle; and S200: the vehicle-mounted display apparatus displays vehicle information if the current geographic position of the vehicle is within a stored geographic range.

By means of the vehicle information display method, the vehicle-mounted display apparatus can display the pre-stored vehicle information only when and if the vehicle is within the pre-determined geographic range, i.e. an area (e.g. a living community, a campus of a company, a parking lot, a mall, etc.) where verification of the identity of the driver of the vehicle is needed. As such, the risk of privacy leak can be greatly lowered.

According to some embodiments of the vehicle information display method, the vehicle-mounted display apparatus comprises an E-ink display panel as the display panel, and as such, the step S200 comprises:

S201: the vehicle-mounted display apparatus powers on the E-ink display panel and refreshes the E-ink display panel for displaying the vehicle information; and S202: the vehicle-mounted display apparatus powers off the E-link display panel.

Optionally, prior to step S200, the vehicle information display method further comprises:

the vehicle-mounted display apparatus receives and stores the geographic range of the vehicle.

In the vehicle information display method, the vehicle information can include at least one of vehicle license information and a pseudo mobile phone number.

According to some embodiments of the vehicle information display method, the vehicle information to be displayed includes vehicle license information.

Optionally, the vehicle license information may be pre-stored or stored beforehand.

As such, prior to step S200, the vehicle information display method further comprises:

the vehicle-mounted display apparatus receives and stores the vehicle license information of the vehicle.

Correspondingly, the step S200 comprises:

the vehicle-mounted display apparatus displays the vehicle license information when the geographic position of the vehicle is within a geographic range.

According to some embodiments of the vehicle information display method, the vehicle information includes a pseudo mobile phone number.

Figure 6:
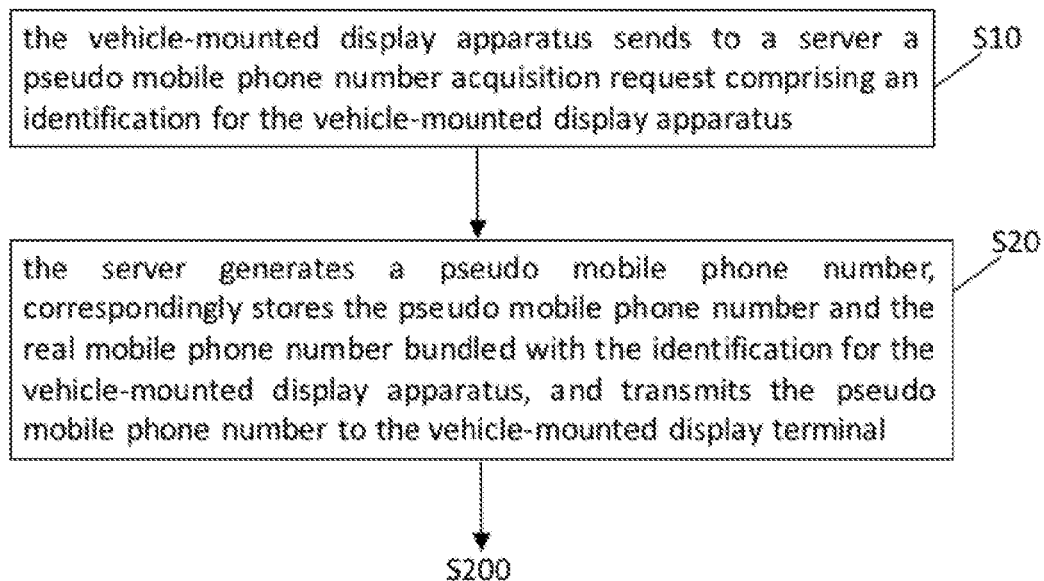
FIG. 6 illustrates a flow chart of an information display method according to some embodiments of the disclosure.

As such, prior to step S200, the vehicle information display method comprises the following steps, as illustrated in FIG. 6:

S10: the vehicle-mounted display apparatus sends to a server a pseudo mobile phone number acquisition request comprising an identification for the vehicle-mounted display apparatus; and S20: the server generates a pseudo mobile phone number, correspondingly stores the pseudo mobile phone number and the real mobile phone number bundled with the identification for the vehicle-mounted display apparatus, and transmits the pseudo mobile phone number to the vehicle-mounted display apparatus.

In the step S200 of the vehicle information display method, the vehicle information can be displayed when the vehicle has a speed smaller than a preset threshold speed, or even stops moving or is locked off.

It is noted that any of the above various embodiments of the steps for the information display method disclosed herein can be combined in any combination, and because they have been detailed above, the description of them will be skipped herein.

Figure 7:
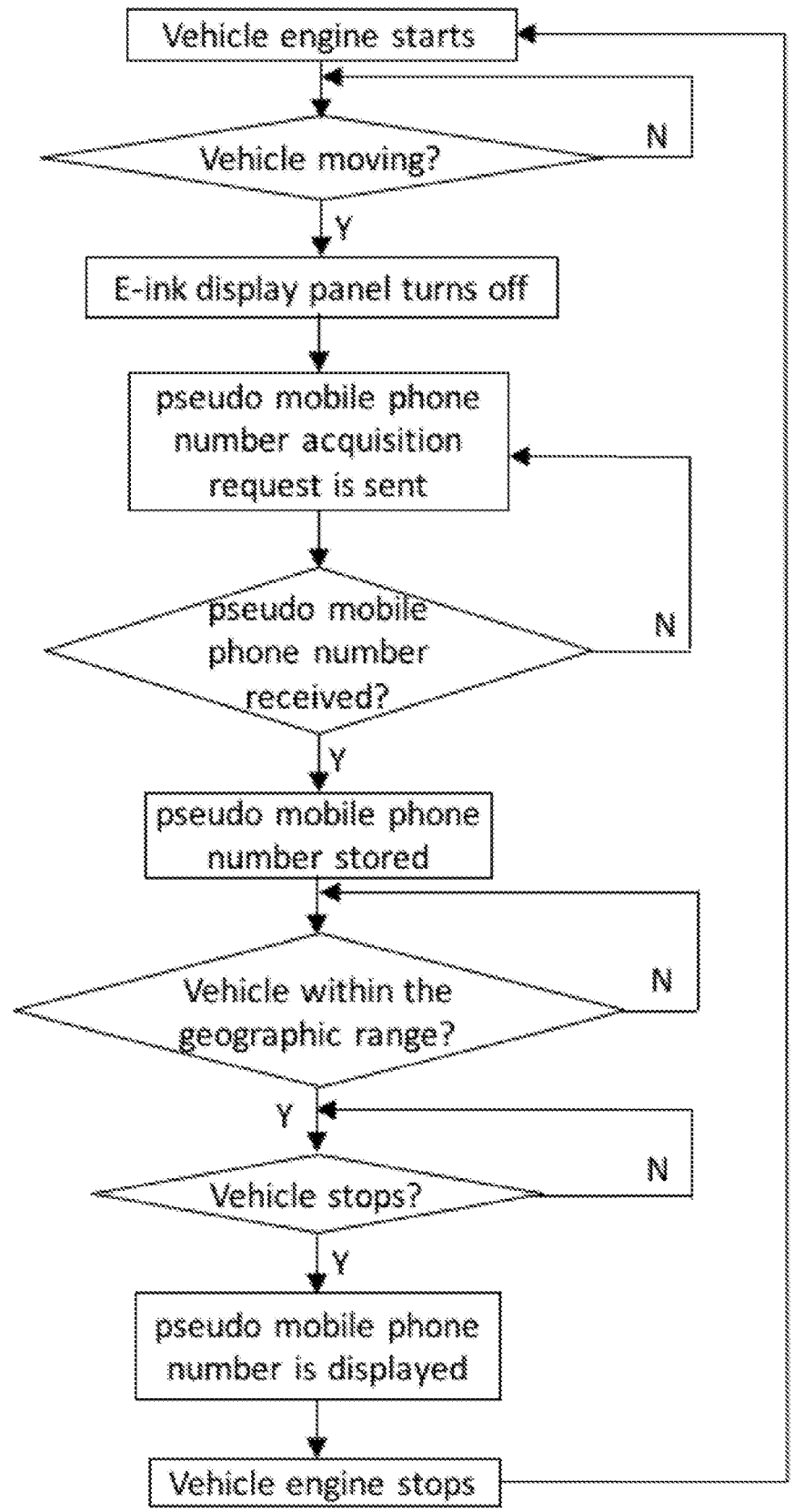
FIG. 7 is a flow chart of a vehicle information display method according to one specific embodiment of the disclosure.

FIG. 7 is a flow chart of a vehicle information display method according to one specific embodiment of the disclosure. In this specific embodiment, when the vehicle is moving after the engine starts, the E-ink display panel (i.e. used in the vehicle-mounted display apparatus) is turned off and the vehicle-mounted display apparatus sends out a pseudo mobile phone number acquisition request to a server in a cloud (not shown in FIG. 7), where a pseudo mobile phone number is generated and transmitted back to the vehicle-mounted display apparatus. Then the vehicle-mounted display apparatus stores the pseudo mobile phone number in the memory. After the vehicle is determined to be within the geographic range, and further determined to have stopped, the pseudo mobile phone number is displayed on the E-ink display panel.

In the embodiments of the vehicle information display method where the vehicle information includes vehicle license information, the vehicle license information can be sent by the information push terminal, such as a mobile phone used by the driver/owner.

As such, prior to the step S200, the vehicle information display method comprises:

the information push terminal sends the vehicle license information to the vehicle-mounted display apparatus.

Optionally, the information push terminal also sends the geographic range to the vehicle-mounted display apparatus.

In summary, by means of the information display method, the information push terminal can send the vehicle license information to the vehicle-mounted display apparatus, and the vehicle-mounted display apparatus displays the vehicle license information when and if the geographic position of the vehicle indicated by the geographic position information that is obtained is within a pre-determined geographic range, e.g. a living community, a campus of a company, a parking lot, a mall, etc.) where verification of the identity of the owner of the vehicle is needed. As such, the risk of privacy leak can be greatly lowered.

Figure 8A:
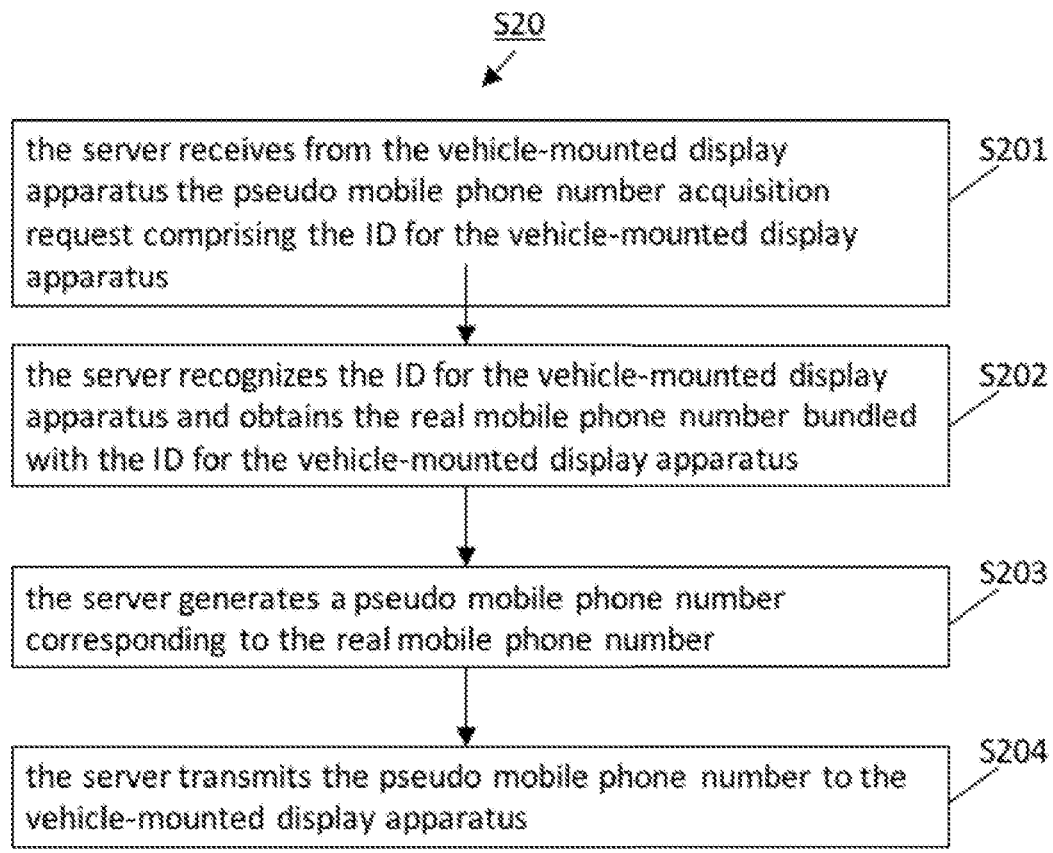
FIG. 8A illustrates a flow chart of the sub-steps involved in the step S20 of the vehicle information display method shown in FIG. 6 according to some embodiments of the disclosure.

In the embodiments of the vehicle information display method where the vehicle information includes a pseudo mobile phone number, the step S20 (i.e. the server generates a pseudo mobile phone number, correspondingly stores the pseudo mobile phone number and the real mobile phone number bundled with the identification for the vehicle-mounted display apparatus, and transmits the pseudo mobile phone number to the vehicle-mounted display apparatus) comprises the follow sub-steps, as illustrated in FIG. 8A.

S201: the server receives from the vehicle-mounted display apparatus the pseudo mobile phone number acquisition request comprising the identification for the vehicle-mounted display apparatus;

S202: the server recognizes the identification for the vehicle-mounted display apparatus and obtains the real mobile phone number bundled with the identification for the vehicle-mounted display apparatus;

S203: the server generates a pseudo mobile phone number corresponding to the real mobile phone number; and S204: the server sends the pseudo mobile phone number to the vehicle-mounted display apparatus.

Figure 8B:
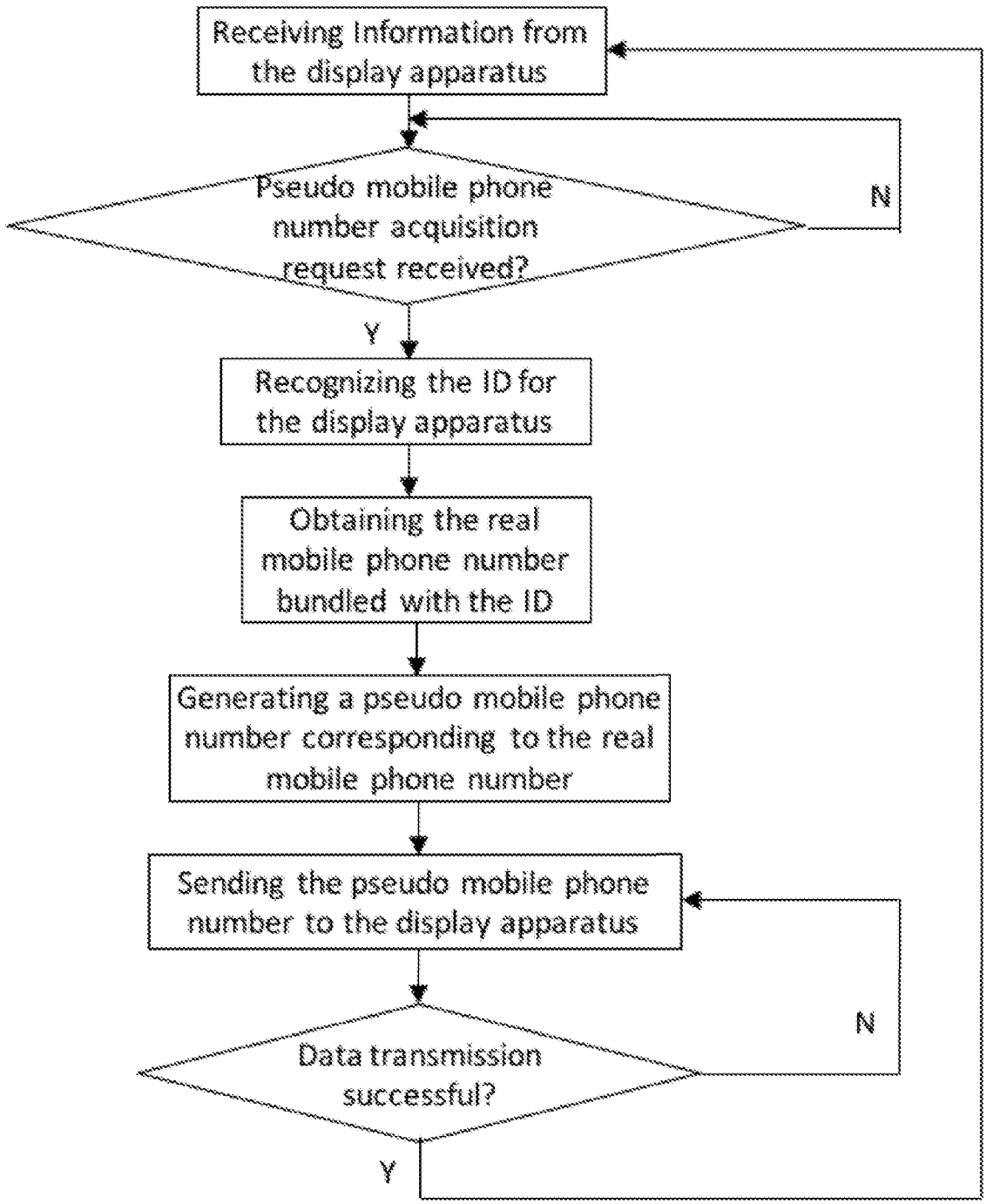
FIG. 8B is a flow chart of the steps performed by the server in the vehicle information display method for generating pseudo mobile phone number corresponding to the real mobile phone number of the driver according to one specific embodiment of the disclosure.

FIG. 8B is a flow chart of the steps performed by the server in the vehicle information display method for generating pseudo mobile phone number corresponding to the real mobile phone number of the driver/owner according to one specific embodiment of the disclosure.

As shown in FIG. 8B, the server regularly receives information from the vehicle-mounted display apparatus (short as display apparatus in the figure) to examine whether a pseudo mobile phone number comprising the ID for the display apparatus. If so, the server recognizes the ID for the display apparatus. Then based on the ID, the server further obtains the real mobile phone number bundled with the ID and then generates a pseudo mobile phone number corresponding to the real mobile phone number. Subsequently, the pseudo mobile phone number is transmitted back to the display apparatus for display.

In summary, by means of the information display method as described above, the server can generate a pseudo mobile phone number upon receiving the pseudo mobile phone number acquisition request from the vehicle-mounted display apparatus, and the server can further send the pseudo mobile phone number to the vehicle-mounted display apparatus for display. Because the pseudo mobile phone number is not the real mobile phone number, there is little risk for privacy leak.

Figure 8C:
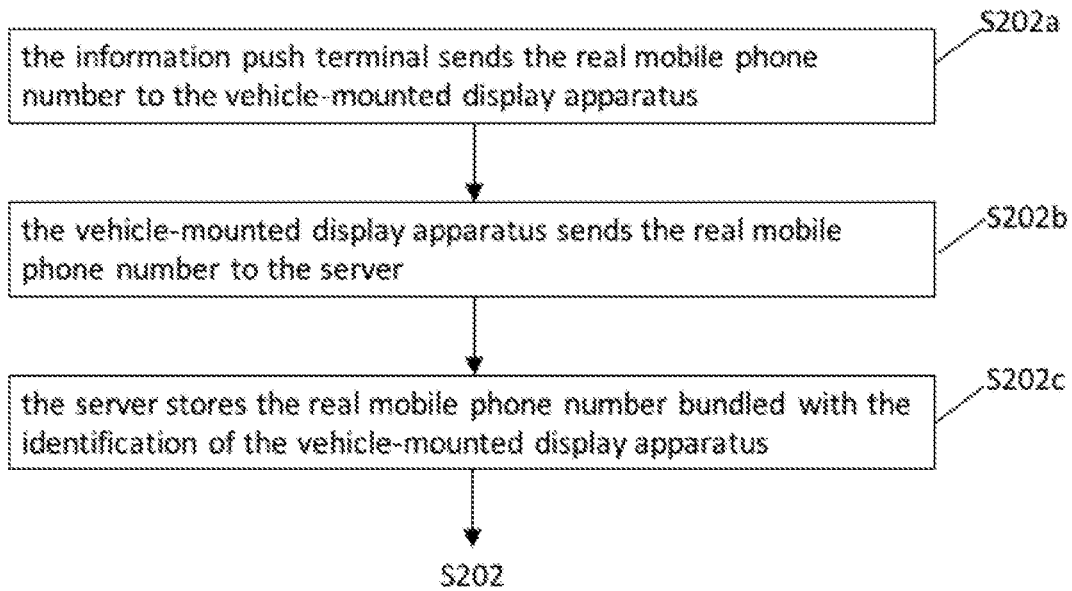
FIG. 8C is a flow chart of the sub-steps that are performed prior to the sub-step S202 shown in FIG. 8A in the vehicle information display method according to some embodiments of the disclosure.

According to some embodiments, the server has the real mobile phone number stored beforehand, and as such, prior to the sub-step S202, the vehicle information display method comprises the following sub-steps, as illustrated in FIG. 8C:

S202a: the information push terminal sends the real mobile phone number to the vehicle-mounted display apparatus;

S202b: the vehicle-mounted display apparatus sends the real mobile phone number to the server; and S202c: the server stores the real mobile phone number bundled with the identification of the vehicle-mounted display apparatus.

Figure 8D:
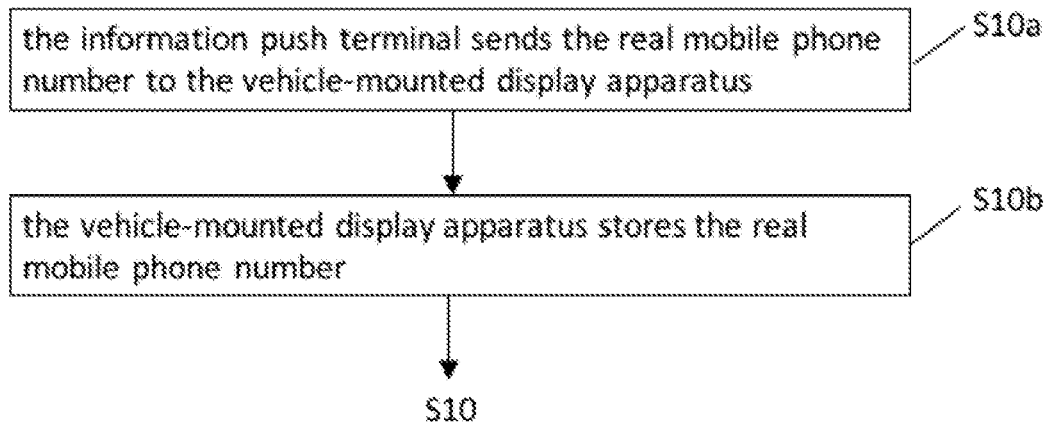
FIG. 8D is a flow chart of the sub-steps that are performed prior to the sub-step S10 in the vehicle information display method according to some embodiments of the disclosure.

According to some other embodiments, the server does not have the real mobile phone number stored beforehand, and as such, prior to the sub-step S10, the vehicle information display method comprises the following sub-steps, as illustrated in FIG. 8D:

S10a: the information push terminal sends the real mobile phone number to the vehicle-mounted display apparatus; and S10b: the vehicle-mounted display apparatus stores the real mobile phone number.

Correspondingly, sub-step S10 comprises:

S10-1: the vehicle-mounted display apparatus sends to a server a pseudo mobile phone number acquisition request comprising the identification for the vehicle-mounted display apparatus and the real mobile phone number.

In the vehicle information display system, when a pseudo mobile phone number is dialed by a primary calling terminal, a calling connection can be established between the primary calling terminal and the information push terminal of the driver/owner by means of the vehicle information display method.

Figure 8E:
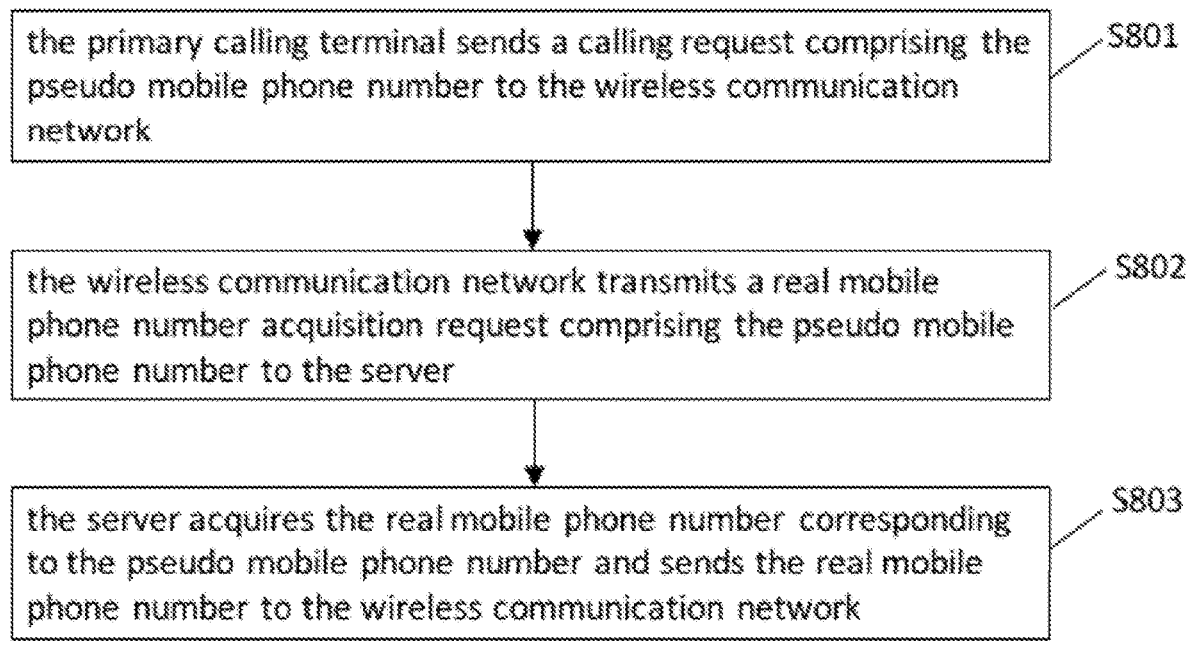
FIG. 8E is a flow chart of the sub-steps of the vehicle information display method after the pseudo mobile phone number is generated and stored corresponding to the real mobile phone number in the server according to some embodiments of the disclosure.

Specifically, after the pseudo mobile phone number is generated and stored corresponding to the real mobile phone number in the server, the vehicle information display method further comprises the following sub-steps, as illustrated in FIG. 8E:

S801: the primary calling terminal sends a calling request comprising the pseudo mobile phone number to the wireless communication network;

S802: the wireless communication network transmits a real mobile phone number acquisition request comprising the pseudo mobile phone number to the server; and S803: the server acquires the real mobile phone number corresponding to the pseudo mobile phone number and sends the real mobile phone number to the wireless communication network.

As such, a calling connection between the primary calling terminal and a called terminal (i.e. the terminal of the driver) associated with the real mobile phone number can be realized.

In the following, with reference to FIG. 9, a flow chart of the vehicle information display method utilizing the vehicle information display system according to one specific embodiment is illustrated.

Figure 9:
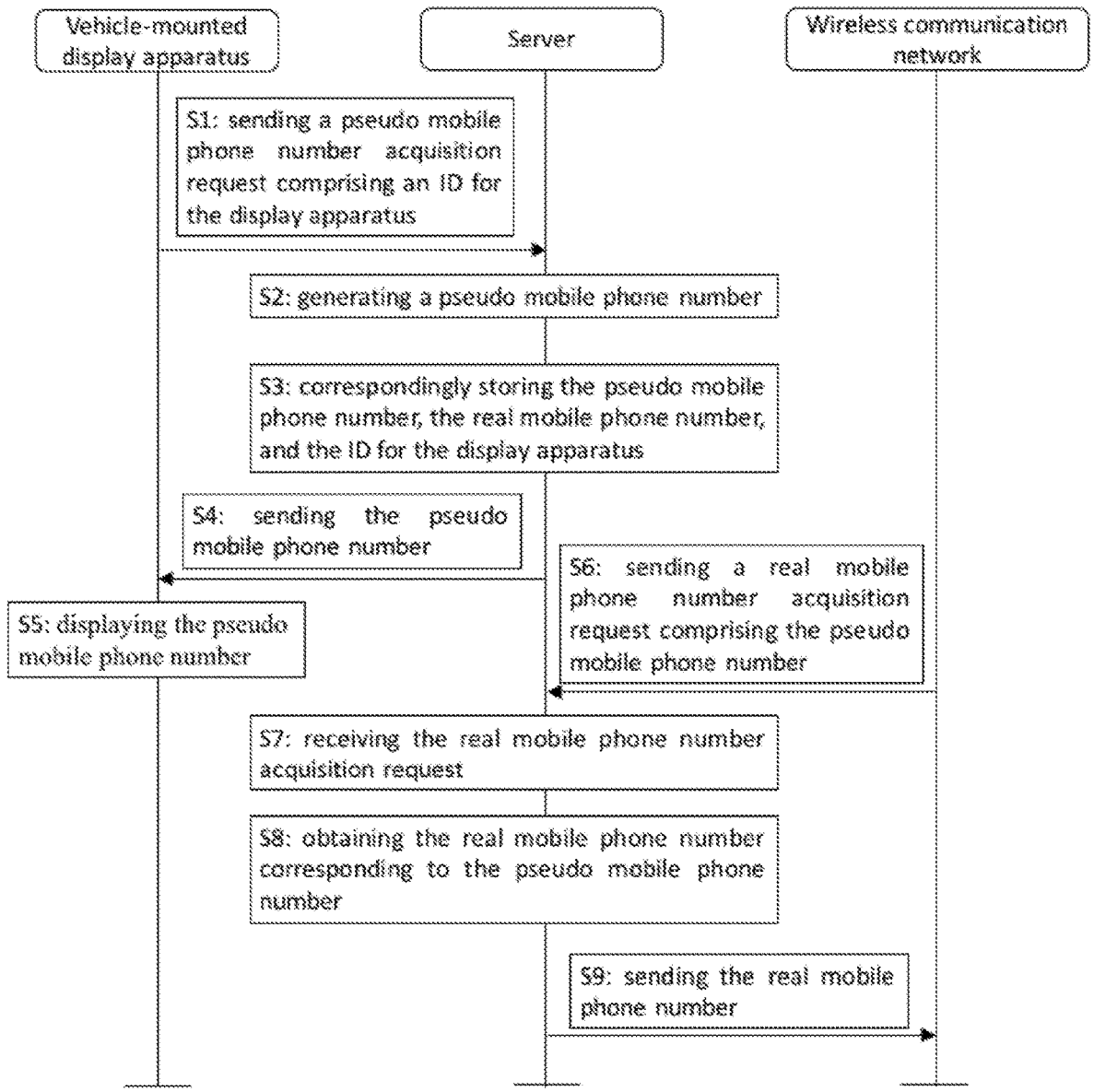
FIG. 9 is a flow chart of the vehicle information display method utilizing the vehicle information display system according to one specific embodiment of the disclosure.

As shown in FIG. 9, the acquiring and displaying the pseudo mobile phone number comprises the following steps S1-S9:

S1: the vehicle-mounted display apparatus sends a pseudo mobile phone number acquisition request comprising an identification for the vehicle-mounted display apparatus to the server.

Herein the vehicle-mounted display apparatus can send the pseudo mobile phone number acquisition request to the server when and if the geographic position of the vehicle indicated by the geographic position information that is obtained is within a pre-determined geographic range.

S2: the server generates a pseudo mobile phone number upon receiving the pseudo mobile phone number acquisition request.

Herein the pseudo mobile phone number generated by the server can be a string of random digits that conforms to a preset rule, which can for example, set a preset number or a starting digit for the string of random digits, etc.

S3: the server correspondingly stores the pseudo mobile phone number, the real mobile phone number, and the identification for the and the vehicle-mounted display apparatus.

If the above real mobile phone number is stored in the server, the server can directly correspondingly store the pseudo mobile phone number and the real mobile phone number stored therein. If the above real mobile phone number is not stored in the server, the pseudo mobile phone number acquisition request can comprise the real mobile phone number, and then the server can correspondingly store the pseudo mobile phone number and the real mobile phone number contained in the pseudo mobile phone number acquisition request.

S4: the server sends the pseudo mobile phone number to the vehicle-mounted display apparatus.

S5: the vehicle-mounted display apparatus displays the pseudo mobile phone number.

Optionally, the vehicle-mounted display apparatus can display the vehicle license information at the same time of displaying the pseudo mobile phone number.

When the vehicle-mounted display apparatus displays the pseudo mobile phone number, other people can see the pseudo mobile phone number displayed by the vehicle-mounted display apparatus, and dial the pseudo mobile phone number via the primary calling terminal. As such, the server can carry out the following steps S6-S9 which involve an interactive communication with the wireless communication network (e.g. a base station) to thereby establish a calling connection between the primary calling terminal and a called terminal (i.e. the terminal of the driver) associated with the real mobile phone number S6: the wireless communication network sends a real mobile phone number acquisition request comprising the pseudo mobile phone number to the server when the wireless communication network receives a calling request from the primary calling terminal and detects that the calling request comprises the pseudo mobile phone number.

Specifically, the primary calling terminal can send a calling request comprising the pseudo mobile phone number to a base station, and the base station can detect if the calling request comprises the pseudo mobile phone number and can then send the real mobile phone number acquisition request comprising the pseudo mobile phone number to the server.

S7: the server receives the real mobile phone number acquisition request from the wireless communication network.

S8: the server obtains the real mobile phone number that is correspondingly stored with the pseudo mobile phone number.

S9: the server sends the real mobile phone number to the wireless communication network, and the wireless communication network establishes a calling connection between the primary calling terminal and the called terminal associated with the real mobile phone number.

In yet another aspect, the disclosure further provides an information push terminal.

Figure 10:
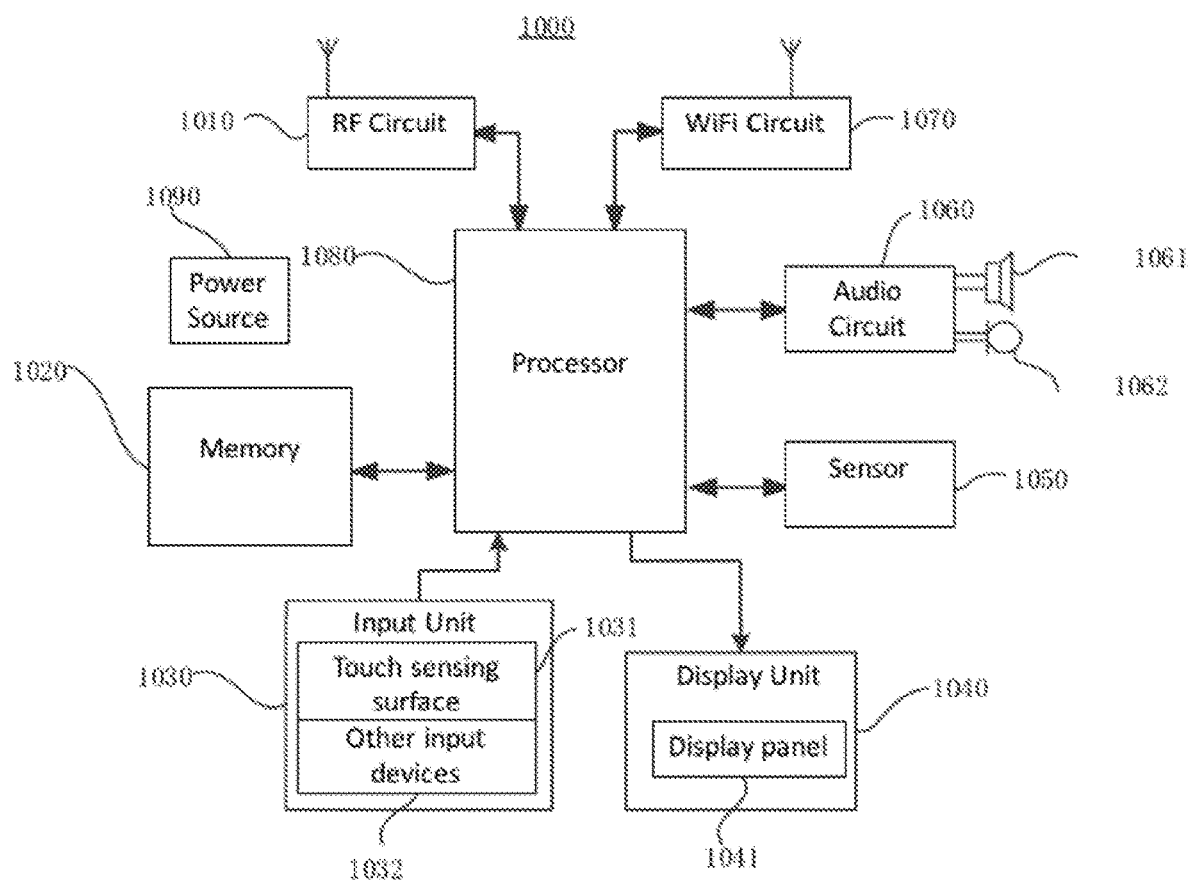
FIG. 10 illustrates a block diagram of the information push terminal according to some embodiments of the disclosure.

FIG. 10 illustrates a block diagram of the information push terminal according to some embodiments of the disclosure.

As shown in FIG. 10, the information push terminal 100 comprises: a radio frequency (RF) circuit 1010, a memory 1020 comprising at least one computer-readable storing medium, an input unit 1030, a display unit 1040, a sensor 1050, an audio circuit 1060, a WiFi circuit 1070, a processor 1080 comprising at least one processing core, and a power source 1090.

The radio frequency circuit 1010 is configured to receive and transmit signals when sending or receiving information or during a calling. Specifically, the radio frequency circuit 1010 is configured, upon receiving the downward information from the base station, to relay the downward information to the processor 1080, and to send the upward information to the base station. Herein the radio frequency circuit 1010 can comprise an antenna, at least one amplifier, at least one tuner, at least one oscillator, a user SIM card, a transceiver, a coupler, a low noise amplifier (LNA), a diplexer, etc. The radio frequency circuit 1010 can be configured to communicate with the internet, or other components in a manner of a wireless communication. Herein the protocol for the wireless communication can include, but not limited to, GSM, GPRS, CDMA, WCDMA, LTE, SMS, Email, etc.

The memory 1020 is configured to store software programs and modules, and the processor 1080 can run these software programs and modules stored in the memory 1020 to thereby realize various functional applications and data processing. The memory 1020 may include a program storage partition and a data storage partition.

The program storage partition can store an operating system, at least one application that is required herein (such as an audio playback application, an image playback application, etc.). The data storage partition can store the data according to the data created at the information push terminal 1000 (such as audio data, contacts, phone book, etc.).

In addition, the memory 1020 can include a high-speed random access memory, and a non-volatile memory, such as at least one disk storage device, a flash memory device, a volatile solid-state memory device, etc. Accordingly, the memory 1020 may also include a memory controller to thereby provide access to the memory 1020 by the processor 1080 and the input unit 1030.

The input unit 1030 can be configured to receive numbers, letters, and characters that are inputted by the user, and then to generate input signals for a keyboard, a mouse, a joystick, an optical ball, or a trackball that are related to user settings and function control. Specifically, the input unit 1030 may include a touch sensing surface 1031 and other input device 1032. The touch sensing surface 1031, also known as touch screen or touch pad, can detect touch operations by a user on or near the touch sensing surface 1031 (such as a user finger, a stylus, or another accessory), based on which, a corresponding connecting device can be driven based on a preset driving software.

Optionally, the touch sensing surface 1031 can include a touch detection device and a touch controller. The touch detection device is configured to detect a position of a touch operation by the user, and then to send the touch signal associated with the touch operation to the touch controller. Upon receiving the touch signal from the touch detection device, the touch controller converts it to a touch coordinate, and then sends the touch coordinate to the processor 1080. The touch controller can also receive and execute commands from the processor 1080.

There can be a variety of touch control types for the touch sensing surface 1031, such as a resistance type, a capacitance type, an infrared type, and a surface acoustic wave type, etc. In addition to the touch sensing surface 1031, the input unit 1030 may also include other input devices 1032, which can include, but are not limited to, a physical keyboard, a functional key (such as volume control buttons, switch buttons, etc.), and one or more of a trackball, a mouse and a joystick.

The display unit 1040 is configured to display the information inputted by the user or to provide information to the user, and to provide various graphical user interfaces for the information push terminal 1000. These graphical user interfaces can comprise graphics, texts, icons, videos and any combination of them.

The display unit 1040 can include a display panel 1041, which can optionally be a LCD display panel, or an OLED display panel, etc.

The touch sensing surface 1031 can be configured to cover the display unit 1040. When the touch sensing surface 1031 detects a touch operation on or near it, the touch signal is transmitted to the processor 1080 to determine a type of the touch operation. Subsequently, the processor 1080 provides a corresponding visual output to the display panel 1041 according to the type of the touch operation.

It is noted that although the touch sensing surface 1031 and the display panel 1041 are shown in the embodiment as illustrated in FIG. 10 as two independent components to respectively realize an input function and an output function, according to some other embodiments, the touch sensing surface 1031 and the display panel 1041 can be integrated to achieve both the input function and the output function.

The information push terminal 1000 can include at least one sensor 1050, such as an optical sensor, a motion sensor, etc. Specifically, the optical sensor can include an ambient light sensor and proximity sensor, wherein the ambient light sensor can be used to detect the brightness of the ambient light around the display panel 1041 to adjust the brightness of the display panel 1041. The proximity sensor can be used to turn off the display panel 1041 or the backlight thereof when the information push terminal 1000 is close to the ear of the user.

As a motion sensor, a gravity acceleration sensor can be used to detect acceleration in all directions (three axis), and can detect a magnitude and a direction of the gravity when still. As such, the gravity acceleration sensor can be used in applications of a mobile phone for recognizing the orientations of the mobile phone (such as screen switching, related games, magnetometer attitude calibration), and for vibration identification related functions (e.g. pedometer, percussion, etc.).

The information push terminal 1000 can also be provided with a gyroscope, barometer, hygrometer, thermometer, infrared sensor and other sensors.

The audio circuit 1060, the speaker 1061, the microphone 1062 can be configured to provide an audio interface between the user and the information push terminal 1000. The audio circuit 1060 can convert an audio data to an electric signal and then transmit the electric signal to the speaker, 1061, which then converts the electric signal into a sound signal and outputs the sound signal.

On the other hand, the microphone 1062 can convert the sound signals that has been collected into electrical signals, which are then converted into an audio data by the audio circuit 1060. The audio data is then outputted to the processor 1080 for processing, and the processed audio data can then be transmitted to another information push terminal by the RF circuit 1010, or can be outputted to the memory 1020 for further processing. The audio circuit 1060 may also include an earplug hole to provide communication between a peripheral headset and the information push terminal 1000.

WiFi is a short-distance wireless transmission technology. Through the WiFi circuit 1070, the information push terminal 1000 can help users send and receive e-mails, browse web pages, and access streaming media, etc., and thus the WiFi circuit 1070 provides a wireless broadband Internet access for the users. It is noted that although the embodiment as illustrated in FIG. 10 shows the WiFi circuit 1070, the WiFi circuit 1070 is not a required component for the information push terminal 1000, and can thus be omitted without changing the nature of the invention.

The processor 1080 is a control center for the information push terminal 1000, and the processor 1080 is connected with each part of the mobile phone by means of a variety of interfaces and connection lines. The processor 1080 is configured to execute the software programs or modules, and call data, stored in a memory 1020 to implement the various functions and process data for the information push terminal 1000 to thereby realize an overall monitoring of the mobile phone.

Optionally, the processor 1080 may include one or more processing cores. Preferably, the processor 1080 can be provided with an application processor and a modulation and demodulation processor, integrated therewith. The application processor is configured to mainly deal with jobs including handling the operating system, the user interfaces and, the application programs. The modulation and demodulation processor is configured to mainly deal with wireless communications. It is understandable that the aforementioned modulation and demodulation processor may not be integrated into the processor 1080.

The information push terminal 1000 may include a power supply 1090 (such as a battery) configured to power each component of the information push terminal 1000. Preferably, the power supply 1090 can be logically connected with the processor 1080 through a power management system, so as to realize the management of charging, discharging, and energy consumption functions through the power management system. The power supply 1090 can include one or more DC or AC power supply, a recharging system, a power failure detection circuit, a power converter or inverter, a power status indicator, and any other components.

The information push terminal 1000 can further comprise a camera, a Bluetooth circuit, etc., which are not shown in the drawings and will be skipped for detailed description.

According to some embodiment, the display unit of the information push terminal can comprise a touch control display panel, and the information push terminal can include a memory, and one or more program applications, which are stored in the memory and can be executed by the processor.

Figure 11:
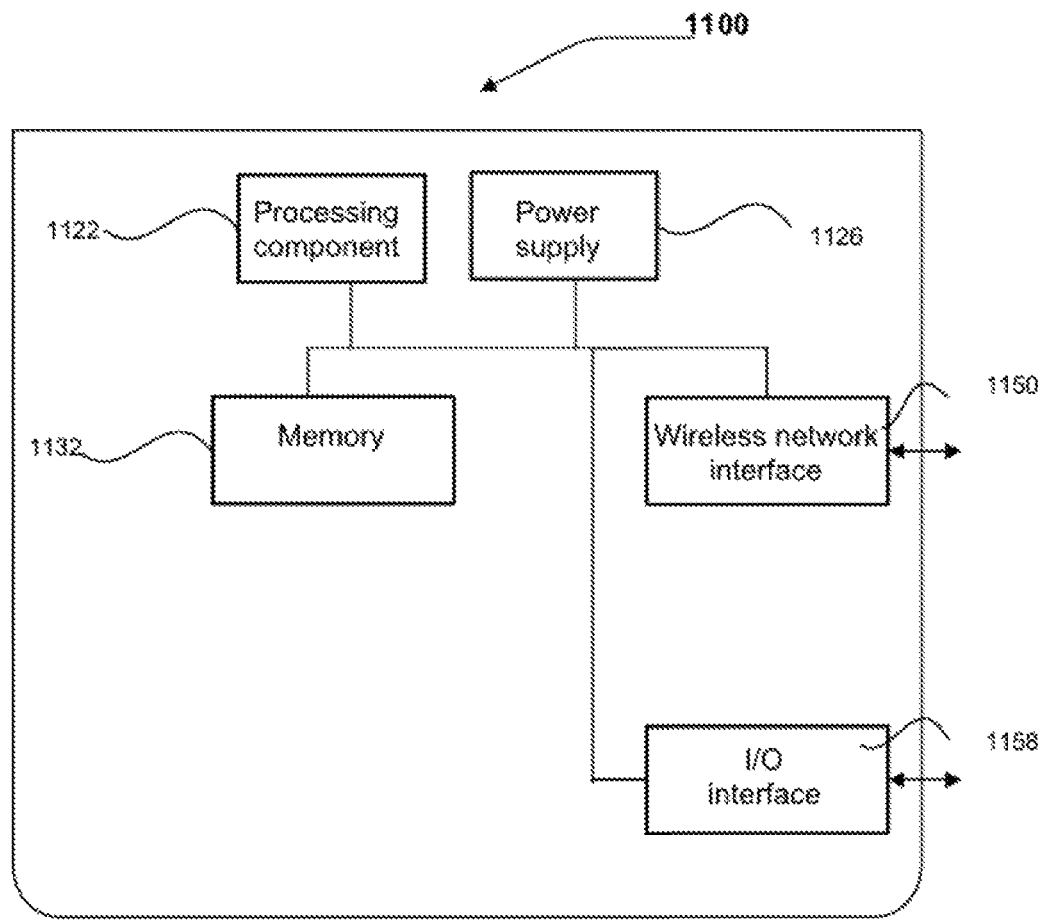
FIG. 11 illustrates a block diagram of a server according to some embodiments of the disclosure.

FIG. 11 illustrates a block diagram of a server 1100 according to some embodiments of the disclosure. As shown in FIG. 11, the server 1100 includes a processing component 1122 comprising one or more processors, which is configured to execute instructions. The server 1100 further comprises a memory resource such as the memory 1132, which is configured to store instructions (e.g. application programs) that can be executed by the processing component 1122. The application programs stored in the memory 1132 may also include one or more modules that correspond to a set of instructions.

The server 1100 can also include a power supply 1126 configured to execute power management of the server 1100, a wired or wireless network interface 1150 configured to connect the server 1100 to the network, and an input and output (I/O) interface 1158. The server 1100 can operate on the basis of an operating system that is stored in the memory 1132, such as Windows Server™, Mac OS X™, Unix™, Linux™, FreeBSD™, or alike.

In an exemplary embodiment, the disclosure provides a computer readable storage medium, which can be a non-volatile storage medium. The computer readable storage medium can store a computer program, which is configured to be executed by the processor to thereby implement the information display method as described above.

It is noted that people of ordinary skills in the field can realize part or all of the above-mentioned steps in the information display method according to any one of the embodiments as described above can be realized by hardwares, or can be realized through program applications to send instructions to related hardwares. The program applications can be stored in a computer readable storage medium, which can be a read-only memory, a disk, or a CD, etc.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display apparatus configured to be mounted on a vehicle and display vehicle information, the display apparatus comprising:
    a display panel;
    a geographic position acquisition circuit, configured to acquire a current geographic position of the vehicle;
    a processor, configured to determine whether the current geographic position of the vehicle is within a stored geographic range, and generate a first control signal if so;
    a display panel driving circuit, configured to control the display panel to display the vehicle information upon receiving the first control signal from the processor; and
    a locked instruction detector configured to detect a locked instruction from the vehicle, wherein:
    the processor is further configured to generate a third control signal if the locked instruction is detected from the vehicle; and
    the display panel driving circuit is further configured to control the display panel to display the vehicle information upon receiving the third control signal from the processor.

2. The display apparatus of claim 1, further comprising an information push terminal communicating circuit configured to communicate with an information push terminal to obtain the vehicle information and the stored geographic range therefrom.

3. The display apparatus of claim 2, wherein the vehicle information comprises at least one of vehicle license information and a pseudo mobile phone number.

4. The display apparatus of claim 2, wherein the vehicle information comprises a pseudo mobile phone number, and the information push terminal communicating circuit is configured to send a request for a real mobile phone number to the information push terminal and then to receive the real mobile phone number from the information push terminal.

5. The display apparatus of claim 4, further comprising a sever communicating circuit configured to send the real mobile phone number and a pseudo mobile phone number acquisition request to a sever and then to obtain the pseudo mobile phone number generated by the sever based on the real mobile phone number.

6. The display apparatus of claim 1, further comprising a vehicle speed detector configured to detect a current speed of the vehicle, wherein:
    the processor is further configured to compare the current speed of the vehicle with a threshold speed and generate a second control signal if the current speed of the vehicle is lower than the threshold speed; and
    the display panel driving circuit is further configured to control the display panel to display the vehicle information upon receiving the second control signal from the processor.

7. The display apparatus of claim 1, wherein the display panel comprises an E-ink display panel.

8. A vehicle information display system, comprising a display apparatus configured to be mounted on a vehicle display vehicle information, the display apparatus comprising:
    a display panel;
    a geographic position acquisition circuit, configured to acquire a current geographic position of the vehicle;
    a processor, configured to determine whether the current geographic position of the vehicle is within a stored geographic range, and generate a first control signal if so; and
    a display panel driving circuit, configured to control the display panel to display the vehicle information upon receiving the first control signal from the processor;
the vehicle information display system further including a server, comprising a second transmitting and receiving circuit and a generating portion, wherein:
    the second transmitting and receiving circuit is configured to receive, and to send to the generating portion, a pseudo mobile phone number request from the display apparatus, wherein the pseudo mobile phone number request carries an identification for the display apparatus;
    the generating portion is configured to generate, and to send to the second transmitting and receiving circuit, a pseudo mobile phone number corresponding to the identification for the display apparatus; and
    the second transmitting and receiving circuit is further configured to send the pseudo mobile phone number to the display apparatus.

9. The vehicle information display system of claim 8, further including an information push terminal, comprising:
    an information input portion configured to allow at least one of vehicle information and geographic range to be inputted into the information push terminal; and
    a first transmitting and receiving circuit configured to transmit the at least one of the vehicle information and the geographic range to a display apparatus.

10. The vehicle information display system of claim 9, wherein:
    the first transmitting and receiving circuit is further configured to receive a request for a real mobile phone number from the display apparatus, and then to send the real mobile phone number to the display apparatus.

11. The vehicle information display system of claim 8, wherein:
    the generating portion is further configured to correspondingly bundle the pseudo mobile phone number with a real mobile phone number by means of the identification for the display apparatus.

12. The vehicle information display system of claim 11, wherein the second transmitting and receiving circuit is configured to beforehand receive the real mobile phone number from the display apparatus.

13. The vehicle information display system of claim 11, wherein the pseudo mobile phone number request carries the real mobile phone number corresponding thereto.

14. The vehicle information display system of claim 11, further comprising a third transmitting and receiving circuit and an acquisition portion, wherein:
- the third transmitting and receiving circuit is configured to receive a real mobile phone number request carrying the pseudo mobile phone number from a wireless communication network upon a calling request is sent from the primary calling terminal to the wireless communication network;
- the acquisition portion is configured, upon receiving the real mobile phone number request from the third transmitting and receiving circuit, to obtain the real mobile phone number corresponding to the pseudo mobile phone number from the generating portion; and
- the third transmitting and receiving circuit is further configured, upon receiving the real mobile phone number from the acquisition portion, to send the real mobile phone number to the wireless communication network.

15. A method for displaying vehicle information utilizing a display apparatus configured to be mounted on a vehicle, the method comprising:
- obtaining a current geographic position of the vehicle; and
- determining whether the current geographic position of the vehicle is within a stored geographic range; and if so,
- displaying the vehicle information;
- wherein the vehicle information comprises at least one of vehicle license information and a pseudo mobile phone number;
- wherein the vehicle information comprises a pseudo mobile phone number; and
- wherein the method further comprises, prior to the displaying the vehicle information:
  - sending a pseudo mobile phone number request carrying an identification for the display apparatus to a server;
  - generating the pseudo mobile phone number corresponding to the identification for the display apparatus in the server; and
  - receiving the pseudo mobile phone number from the server.

16. The method according to claim 15, further comprising, prior to the displaying the vehicle information:
- obtaining at least one of the vehicle information and the geographic range from an information push terminal.

17. The method according to claim 15, further comprising, after the generating the pseudo mobile phone number corresponding to the identification for the display apparatus in the server:
- correspondingly bundling the pseudo mobile phone number with a real mobile phone number in the server.

18. The method according to claim 17, wherein the real mobile phone number is beforehand stored in the server.

19. The method according to claim 17, wherein the real mobile phone number is carried in the pseudo mobile phone number request.

20. The method according to claim 17, further comprising, after the correspondingly bundling the pseudo mobile phone number with a real mobile phone number in the server:
- a wireless communication network sending a real mobile phone number request carrying the pseudo mobile phone number to the server upon receiving a calling request from the primary calling terminal;
- the server obtaining the real mobile phone number corresponding to pseudo mobile phone number; and
- the server sending the real mobile phone number to the wireless communication network to thereby establish a calling between the primary calling terminal and a mobile phone having the real mobile phone number.

21. The method according to claim 15, wherein the sending a pseudo mobile phone number request carrying an identification for the display apparatus to a server is performed if the current geographic position of the vehicle is within the stored geographic range.

* * * * *